US012794824B2

(12) United States Patent
Mishol et al.

(10) Patent No.: US 12,794,824 B2
(45) Date of Patent: Nov. 10, 2026

(54) HOST-CONTROLLER INTERFACE (HCI) COMMUNICATION

(71) Applicant: Texas Instruments Incorporated, Dallas, TX (US)

(72) Inventors: Guy Mishol, Shoham (IL); Yaron Alpert, Hod-Hasharon, IL (US); Yoav Ben-Yehezkel, Netanya (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 223 days.

(21) Appl. No.: 18/405,682

(22) Filed: Jan. 5, 2024

(65) Prior Publication Data

US 2025/0227072 A1 Jul. 10, 2025

(51) Int. Cl.
*H04L 47/41* (2022.01)

(52) U.S. Cl.
CPC .................................... *H04L 47/41* (2013.01)

(58) Field of Classification Search
CPC ......... H04L 47/41; H04L 47/10; H04L 67/12; H04L 69/22; H04L 69/321; H04L 69/323; H04L 69/324; H04L 69/14; H04L 45/245; H04W 4/80
See application file for complete search history.

(56) References Cited

U.S. PATENT DOCUMENTS 10,841,771 B2 * 11/2020 Malovany ............... H04W 4/80
2002/0021679 A1 * 2/2002 Paneth .................... H04L 1/188 370/468
2009/0221320 A1 * 9/2009 Walley .................. H04L 69/324 455/552.1
2015/0138986 A1 * 5/2015 Gale ..................... H04L 47/125 370/237
2019/0041835 A1 * 2/2019 Cella ....................... H04W 4/80
2019/0327178 A1 * 10/2019 Wu ......................... H04L 47/41
2023/0281527 A1 * 9/2023 Cella ....................... H04L 67/12 705/7.17

OTHER PUBLICATIONS

Kasar, H., et al., "To Develop a Host Stack for Maximizing BLE Performance in Multi-Link Scenario," 3rd International Conference for Emerging Technology (INCET), May 27-29, 2022, 6 pages. {Supplied by Applicant) (Year: 2022).*
Kasar, H., et al., "To Develop a Host Stack for Maximizing BLE Performance in Multi-Link Scenario," 3rd International Conference for Emerging Technology (INCET), May 27-29, 2022, 6 pages.
International Search Report and Written Opinion mailed Apr. 16, 2025, PCT Application No. PCT/US2025/010155, 8 pages.

(Continued)

*Primary Examiner* — Richard G Keehn
(74) *Attorney, Agent, or Firm* — Michelle F. Murray; Charles F. Koch

(57) ABSTRACT

An example device includes a first communication interface having a first bandwidth, a second communication interface having a second bandwidth, and selection circuitry configured to aggregate communication associated with the first communication interface and the second communication interface to an aggregation interface having a third bandwidth greater than the first bandwidth or the second bandwidth.

28 Claims, 21 Drawing Sheets

(56) References Cited

OTHER PUBLICATIONS

Core Specification Working Group, “Bluetooth Core Specification,” Bluetooth, Jan. 31, 2023, v5.4, 3112 pages.
Texas Instruments, “Host Controller Interface (HCI),” BLE5-Stack User’s Guide, retrieved from << https://software-dl.ti.com/Iprf/simplelink_cc2640r2_latest/docs/ble5stack/ble_user_guide/html/ble-stack-5.x/hci.html>>, 2016,10 pages.
Peña et al., “Uart: A Hardware Communication Protocol Understanding Universal Asynchronous Receiver/Transmitter,” AnalogDialogue, retrieved from <<https://www.analog.com/en/analog-dialogue/articles/uart-a-hardware-communication-protocol.html#:~:text=Embedded>>, Dec. 2020, vol. 54, No. 4, 13 Pages.

* cited by examiner

HOST-CONTROLLER INTERFACE (HCI) COMMUNICATION

FIELD OF THE DISCLOSURE

This disclosure relates generally to electronic systems and methods, and, in some embodiments to host-controller interface (HCI) communication.

BACKGROUND

Device to device communication has become a ubiquitous occurrence in view of increasing numbers of personal computing devices and internet-of-things (IoT) devices. These devices include particular performance expectations, such as power consumption capabilities and communication speeds.

SUMMARY OF THE INVENTION

An example device includes: a first communication interface having a first bandwidth; a second communication interface having a second bandwidth; and selection circuitry configured to aggregate communication associated with the first communication interface and the second communication interface to an aggregation interface having a third bandwidth greater than the first bandwidth or the second bandwidth.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
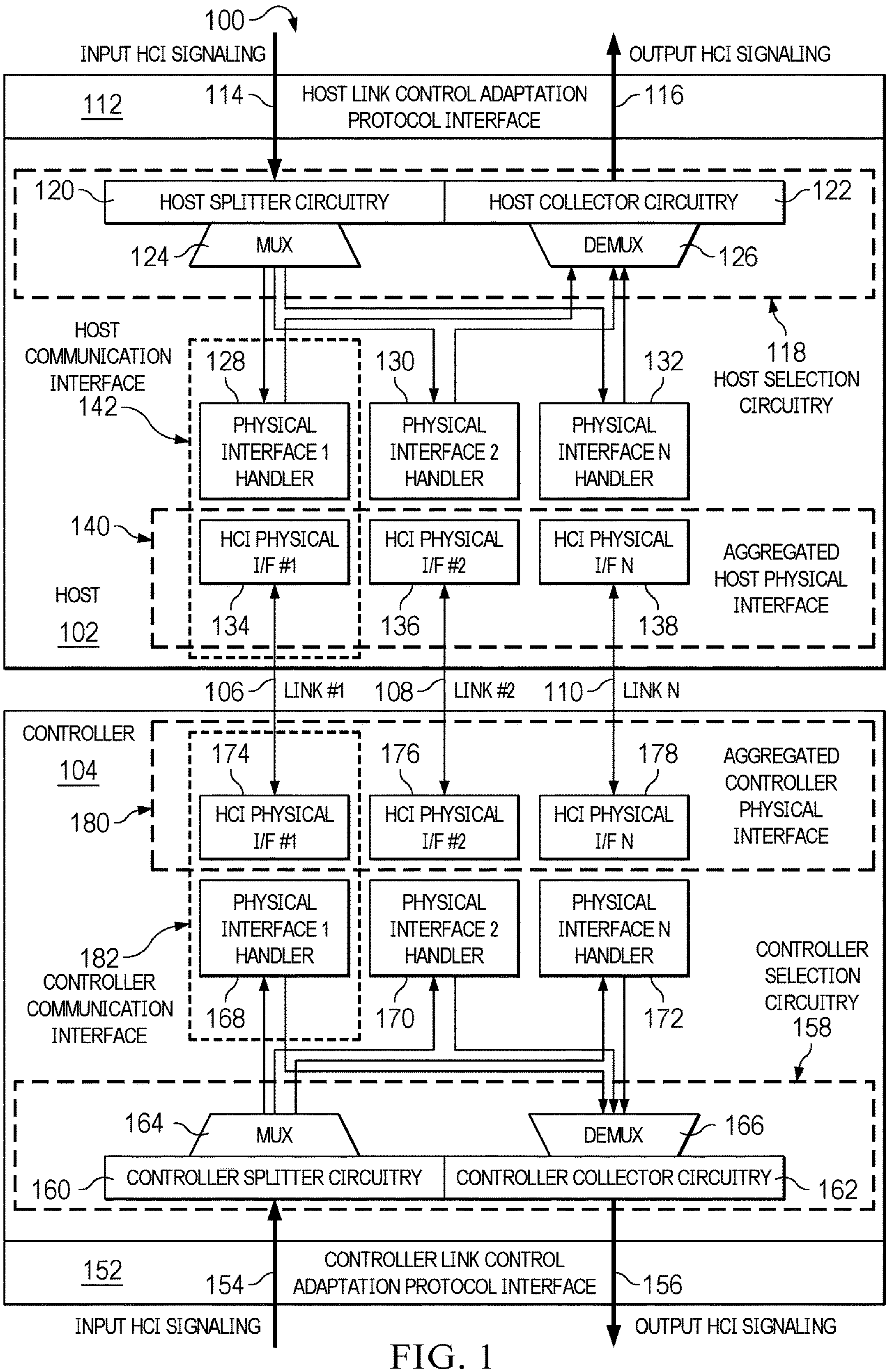
FIG. 1 is a block diagram of an example portion of a Bluetooth device disclosed herein, e.g., to improve host-controller interface (HCI) communication.

Media streaming features, audio features and/or features associated with growing Internet-of-Things (IoT) markets are demanding increasing data rates. In some examples these features are facilitated by Bluetooth wireless standards, including Bluetooth low-energy (BLE) standards to increase bandwidth metrics and/or improve (e.g., reduce) device power consumption associated with data exchange tasks. Bluetooth wireless standards include physical (PHY) and link layers with a host-controller interface (HCI) based on the link control adaptation protocol to the host controller such as serial-peripheral-interface (SPI), USB, SDIO, or universal asynchronous receiver/transmitter (UART). However, low-cost/simple (BW limited)/min footprint I/F/HCI I/F layer(s) are BW limited and, as such, Bluetooth devices with a single physical transport layer (e.g., UART, USB, SDIO, SPI, inter-integrated circuit (I2C), inter-IC sound (I2S), etc.) cannot realize increased throughputs without changes to their transport layer technologies. At least one source of a bottleneck is associated with wireless BLE and/or wireless PHY throughputs exceed HCI throughput capabilities. In some examples, throughput limitations (e.g., bandwidth limitations) are driven by cross token interference. Efforts to increase Bluetooth device throughput include implementation of relatively higher throughput physical host interfaces, but such approaches may increase device footprint sizes and cost.

Bluetooth wireless standards (e.g., the Bluetooth Core specification maintained by the Bluetooth Special Interest Group (SIG)) include a host controller interface (HCI) layer to transport commands and events (including HCI commands/events, ACL data, and SCO data) between a host and one or more controllers. The example HCI layer is an interface between link layers and upper layers. In some examples, a "host" is a logical entity that includes all of the layers below non-core profiles and above the HCI. In some examples, a "controller" is a logical entity having all layers below the HCI. The example HCI is implemented through function calls, commands and callbacks, such as ATT, GAP, etc. that may call an HCI application programming interface (API) to pass from upper layers of the protocol stack through the HCI and eventually to the controller. Similarly, the controller sends received data, commands, and events to the host and upper layers through the HCI, and the controller may also receive data, events and commands through the HCI. In some examples disclosed herein, the HCI is communicatively connected to the physical layers of a corresponding host and controller, in which the physical layers are referred to herein as a physical interface, or an interface.

While Bluetooth devices may include different types of physical interfaces (e.g., SPI, UART, I2C, SDIO, USB, etc.), some examples disclosed herein focus on UART physical interfaces in view of their low footprint and common presence in field deployments. Some embodiments may be implemented with interfaces different from UART.

Bluetooth devices are point-to-point communication devices, in which such point-to-point communication is transparent to any upper layers. For instance, when a packet is sent, such communication occurs in a manner limited to one sending device and one receiving device even in the presence of two or more receiving devices. In some examples this is referred to as half-duplex. UART interfaces reflect this manner of communication and can be considered two-wire devices having a transmit line and a receive line, but examples disclosed herein are not limited thereto. However, with separated transmit (tx) and receive (rx) lines, UART is full duplex that facilitates simultaneous receive and transmit capabilities. Bluetooth devices may also include two or more UART interfaces, but because each interface has a data throughput limitation, such Bluetooth devices remain bandwidth limited. Additionally, in some examples disclosed herein Bluetooth devices may include combinations of interface types, such as devices having UART interfaces, SDIO interfaces, USB interfaces and I2C interfaces, etc.

Some examples disclosed herein advantageously overcome Bluetooth device throughput limitations and/or bottlenecks by, in part, aggregating two or more HCIs on Bluetooth devices having two or more interfaces. Some examples disclosed herein facilitate HCI traffic multiplexing over two or more individual HCIs, each of which includes an interface (e.g., UART, SPI, I2C, etc.). To illustrate, in some examples, while a first interface (e.g., UART) has a particular bandwidth (e.g., a first bandwidth) and a second interface has a second bandwidth, examples disclosed herein aggregate data from any number of interfaces via an interface that exhibits a third bandwidth greater than the first or second bandwidth values. Some examples disclosed herein facilitate a virtual HCI that includes aggregated bidirectional transfers corresponding to two or more relatively lower-throughput HCIs. In some examples, the virtual HCI is referred to herein as an aggregation interface or an aggregated HCI. As such, some examples disclosed herein enable increasing the bidirectional maximum traffic transfer rate over a single virtual HCI interface while maintaining compliance/compatibility with respective individual HCIs and their corresponding interfaces.

Some examples disclosed herein employ splitter structure to distribute incoming HCI commands and events (including HCI commands/events, ACL data, and SCO data) signaling to two or more physical interfaces and/or interface handlers thereof. Some examples configure the example splitter structure to operate in a manner consistent with distribution methodologies/techniques that are based on one or more of interface capabilities and load. Examples disclosed herein enable a sender or a receiver to be either the host or the controller, depending on a direction of the transaction.

FIG. 1 is a block diagram of an example portion of a Bluetooth device 100 disclosed herein to improve (e.g., increase a bandwidth metric) host-controller interface (HCI) communication. In the illustrated example of FIG. 1, the Bluetooth device (BD) 100 includes an example host 102 and an example controller 104 communicatively connected via a first physical link 106, a second physical link 108 and a third physical link 110. While the illustrated example of FIG. 1 includes three links, each of which corresponds to a particular interface (e.g., a physical interface such as UART), examples disclosed herein are not limited thereto. The example host 102 includes an example host link control adaptation protocol interface 112 to receive input HCI commands and events signaling 114 (which may include bytes, packets, etc.) and send output HCI commands and events signaling 116 (which may include bytes, packets, etc.). Generally speaking, a host controller transport layer provides transparent exchange of HCI-specific information. Such example transporting mechanisms provide an ability for the host to send HCI commands, ACL data, and SCO data to a host controller. Such example transport mechanisms also provide an ability for the host to receive HCI events, ACL data, and SCO data from the host controller. Because the host controller transport layer provides transparent exchange of HCI-specific information, the HCI specification specifies the format of the commands, events, and data exchange between the host and the host controller.

Inputs and outputs of the example host link control adaptation protocol interface 112 are communicatively connected to host selection circuitry 118, which includes example host splitter circuitry 120 and example host collector circuitry 122. The example host splitter circuitry 120 is communicatively connected to a multiplexer (MUX) 124 and the example host collector circuitry 122 is communicatively connected to a demultiplexer (DEMUX) 126. While the illustrated figures refer to a DEMUX, examples disclosed herein are not limited thereto. In some examples, an inverse MUX (IMUX) may be implemented. As such, references to DEMUX are not limiting in that regard. Input HCI commands and events signaling 114 are multiplexed by the MUX 124 in a manner consistent with a particular service policy to available physical interface handlers, as described in further detail below. Conversely, HCI packets and/or data from the available physical interface handlers are demultiplexed by the DEMUX 126 in a manner consistent with the particular service policy to the host collector circuitry 122.

The illustrated example of FIG. 1 includes three physical interface handlers on the host side, each of which is communicatively connected to corresponding HCI interfaces of the respective first physical link 106, the second physical link 108 and the third physical link 110. In some examples, a physical link represents a communicative structure such as a wire, a bus, etc. While three physical interface handlers are shown in the illustrated example of FIG. 1, the quantity three is for example purposes and not limitation. In particular, the illustrated example of FIG. 1 includes an example first host physical interface handler 128, an example second host physical interface handler 130, and an example third host physical interface handler 132. Respective ones of the host physical interface handlers are communicatively connected to respective host HCI physical interfaces. In particular, the example first host physical interface (I/F) handler 128 is communicatively connected to an example first host HCI physical I/F 134, the example second host physical I/F handler 130 is communicatively connected to an example second host HCI physical I/F 136, and the example third host physical I/F handler 132 is communicatively connected to an example third host HCI physical I/F 138. Together, the example first host HCI physical I/F 134, the example second host HCI physical I/F 136 and the example third host HCI physical I/F 138 encompass an example aggregated host physical interface 140. Additionally, together the example first host physical I/F handler 128 and the first host HCI physical I/F 134 encompass an example host communication I/F 142. In some examples, the host communication I/F 142 represents transmitter circuitry that includes a (e.g., single) communication path to corresponding receiver circuitry (e.g., a corresponding communication I/F on a controller-side). In some examples, the host communication I/F 142 represents transceiver circuitry that includes transmitter circuitry and receiver circuitry. While the illustrated example of FIG. 1 includes additional host communication interfaces corresponding to combinations of (a) the second host physical I/F hander 130 and the second host HCI physical I/F 136 and (b) the third host physical I/F handler 132 and the third host HCI physical I/F 138, such designations are omitted from FIG. 1 to enhance clarity of the figure. In some examples, host communication interfaces and controller communication interfaces include any type of data exchange, such as information exchange and/or metadata exchange (e.g., data corresponding to control as distinguished from information).

As described above, the illustrated example of FIG. 1 also includes a controller 104 paired with the example host 102. Structure of the example controller 104 is substantially similar to that of the example host 102. The example controller 104 includes an example controller link control adaptation protocol interface 152 to facilitate input HCI commands and events signaling 154 and output HCI commands and events signaling 156. Inputs and outputs of the example controller link control adaptation protocol interface 152 are communicatively connected to controller selection circuitry 158, which includes example controller splitter circuitry 160 and example controller collector circuitry 162. The example controller splitter circuitry 160 is communicatively connected to a multiplexer (MUX) 164 and the example controller collector circuitry 162 is communicatively connected to a demultiplexer (DEMUX) 166 (or an example IMUX, as described above). Input HCI commands and events signaling 154 are multiplexed by the MUX 164 in a manner consistent with the particular service policy (discussed in further detail below) to available physical interface handlers. Conversely, HCI packets and/or data from the available physical interface handlers are demultiplexed by the DEMUX 166 in a manner consistent with the particular service policy to the controller collector circuitry 162.

The illustrated example of FIG. 1 includes three physical I/F handlers on the controller side, each of which is communicatively connected to corresponding HCI interfaces of the respective first physical link 106, the second physical link 108 and the third physical link 110. In particular, the illustrated example of FIG. 1 includes an example first controller physical I/F handler 168, an example second controller physical I/F handler 170, and an example third controller physical I/F handler 172. Respective ones of the controller physical I/F handlers are communicatively connected to respective controller HCI interfaces. In particular, the example first controller physical I/F handler 168 is communicatively connected to an example first controller HCI physical I/F 174, the example second controller physical I/F handler 170 is communicatively connected to an example second controller HCI physical I/F 176, and the example third controller physical I/F handler 172 is communicatively connected to an example third controller HCI physical I/F 178. Together, the example first controller HCI physical I/F 174, the example second controller HCI physical I/F 176 and the example third controller HCI physical I/F 178 encompass an example aggregated controller physical interface 180. Additionally, together the example first controller physical I/F handler 168 and the first controller HCI physical I/F 174 encompass an example controller communication I/F 182. While the illustrated example of FIG. 1 includes additional controller communication interfaces corresponding to combinations of (a) the second controller physical I/F handler 170 and the second controller HCI physical I/F 176 and (b) the third controller physical I/F handler 172 and the third controller HCI physical I/F 178, such designations are omitted from FIG. 1 to enhance clarity of the figure.

In operation, the example Bluetooth device 100 aggregates bidirectional transfers of individual low-capacity HCIs into a virtual single standard BLE HCI. For example, while a single physical interface (e.g., the first host physical I/F handler 128) may exhibit a throughput limitation based on its type (e.g., a UART, etc.), the example aggregated host physical interface 140 aggregates any number of additional physical interfaces (e.g., the example second host physical I/F handler 130 and the example third host physical I/F handler 132) via corresponding HCI interfaces to increase the bidirectional transfer rate between the example host 102 and controller 104. Thus, in some examples, while each physical interface is bandwidth limited due to, in part, its physical capabilities (e.g., UART upper bound transfer rates between the first host HCI physical I/F 134 and the corresponding first controller HCI physical I/F 174 and other pairings), example MUX, DEMUX, splitter circuitry and collector circuitry bandwidth capabilities exceed that of individual physical interfaces. As such, example HCI interface aggregation disclosed herein may advantageously facilitate an ability for Bluetooth devices to transfer data at relatively higher rates without augmenting the physical structure of such individual physical interfaces.

The example Bluetooth device 100 operates in a manner consistent with a particular service policy, which may be negotiated between the example host 102 and controller 104. For example, and as described in further detail below, one example service policy (e.g., service policy type) is a single byte-level. When the example host operates as a sending device, the single byte-level service policy causes the example host splitter circuitry 120 to send one byte to each physical I/F handler via the example MUX 124 in a round-robin manner to each corresponding HCI I/F. On the receiving side by the example controller 104, each corresponding controller-side HCI I/F receives those bytes in their round-robin manner, which is passed to each corresponding physical I/F handler, which terminates to the example DEMUX 166 for ultimate transfer to the controller collector circuitry 162.

In addition to the example single byte-level service policy, some examples disclosed herein facilitate a fixed multi byte-level service policy, a variable multi byte-level service policy, a single HCI packet-level service policy, a fixed multi HCI packet-level service policy, and a variable multi HCI packet-level service policy. Each service policy is described in further detail below. While a particular service policy may be negotiated between the example host 102 and the example controller 104 (e.g., in which either may operate as a transmitter side, a receiver side, or both simultaneously) at a first time, the example splitter circuitry and/or the example collector circuitry may re-negotiate the particular service policy to be used in a dynamic manner, in some examples.

Figure 2:
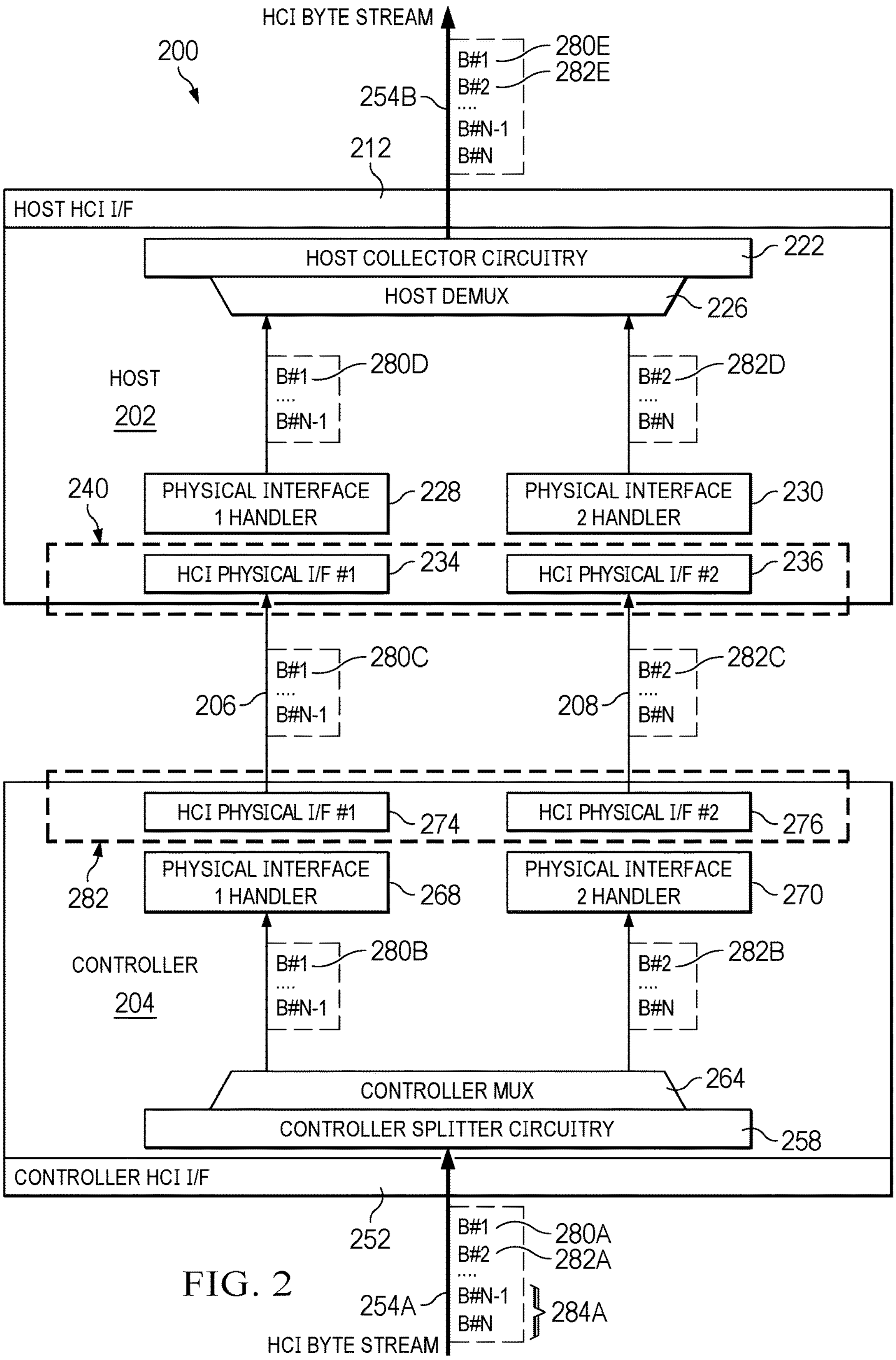
FIGS. 2-7 are block diagrams of example portions of Bluetooth devices disclosed herein having particular service policy communication configurations.

FIG. 2 is a block diagram of an example Bluetooth device 200, e.g., which may advantageously improve (e.g., increase information throughput capabilities) HCI communication when both the host and the controller are configured with the example single byte-level service policy. The example device 200 of FIG. 2 includes similar structure as described above in connection with FIG. 1 and will refer to similar reference numbers. Additionally, the example device 200 of FIG. 2 includes two physical interfaces for purposes of discussion and not limitation, and will be discussed from the point-of-view of a controller 204 operating as a sending side while a host 202 operates as a receiving side of the device 200. The example host 202 and the example controller 204 are communicatively connected via a first physical link 206 and a second physical link 208. The host 202 includes an example host HCI I/F 212 to send output bytes in a manner compliant with HCI standards. The output bytes are received from example host collector circuitry 222, which is communicatively connected to an example host DEMUX 226.

As described above, the example device 200 of FIG. 2 includes two physical I/F handlers, one of which corresponds to the first physical link 206 and the other of which corresponds to the second physical link 208. The example DEMUX 226 is communicatively connected to an example first host physical I/F handler 228 and an example second host physical I/F handler 230. The example first host physical I/F handler 228 is communicatively connected to a corresponding first host HCI I/F 234, and the example second host physical I/F handler 230 is communicatively connected to a corresponding second host HCI I/F 236. Together, the example first host HCI I/F 234 and the example second host HCI I/F 236 encompass an example aggregated host physical interface 240.

In the illustrated example of FIG. 2, the device 200 is operating in a manner where the controller 204 is transmitting to the host 202. Structure of the example controller 204 is substantially similar to that of the example host 202. The example controller 204 includes an example controller packet I/F 252 to receive input HCI bytes 254A and is communicatively connected to controller splitter circuitry 258 to split the input HCI bytes 254A in a byte-level manner corresponding to the single byte-level service policy. The example controller splitter circuitry 258 is communicatively connected to a controller MUX 264 to facilitate multiplexing bytes of the input HCI bytes 254A to a first controller physical I/F handler 268 and a second controller physical I/F handler 270. Respective ones of the controller physical I/F handlers are communicatively connected to respective controller HCI interfaces. In particular, the example first controller physical I/F handler 268 is communicatively connected to an example first controller HCI I/F 274, and the example second controller physical I/F handler 270 is communicatively connected to an example second controller HCI I/F 276. Together the example first controller HCI I/F 274 and the example second controller HCI I/F 276 encompass an example controller communication I/F 282.

In operation under the single byte-level service policy, bytes of the example HCI byte stream 254A are split by the example controller splitter circuitry 258 in an alternate manner to (a) the example first controller physical I/F handler 268 and (b) the example second controller physical I/F handler 270. For instance, the example HCI byte stream 254A includes a first byte B #1 280A, a second byte B #2 282A, and any number of additional bytes thereafter 284A. In some examples, the alternate manner of the single byte-level service policy is sometimes referred to as a round-robin, which may cause the first byte B #1 280A to be sent by the controller MUX 264 to the first controller physical I/F handler 268 (see B #1 280B), and the second byte B #2 282A to be sent by the controller MUX 264 to the second controller physical I/F handler 270 (see B #2 282B). Thus, in some examples, such as in some examples having only two links, all odd-numbered bytes are sent via one particular link and its associated structure (e.g., the first physical link 206) and all even-numbered bytes are sent via the other link and its associated structure (e.g., the second physical link 208). In some examples having more than two links, the bytes may be distributed to the links in a manner consistent with a scheduling policy (e.g., a round robin manner).

In the illustrated example of FIG. 2, during the single byte-level service policy the first byte B #1 280C propagates over the first physical link 206 and through the example first host HCI I/F 234 to the first host physical I/F handler 228 (e.g., a UART) to the host DEMUX 226 (see the first byte B #1 280D). The example host DEMUX 226 demultiplexes the alternating bytes to reform the example HCI byte stream 254A before being sent to the host collector circuitry 222, which may output the reconstituted HCI byte stream 254B.

Figure 3:
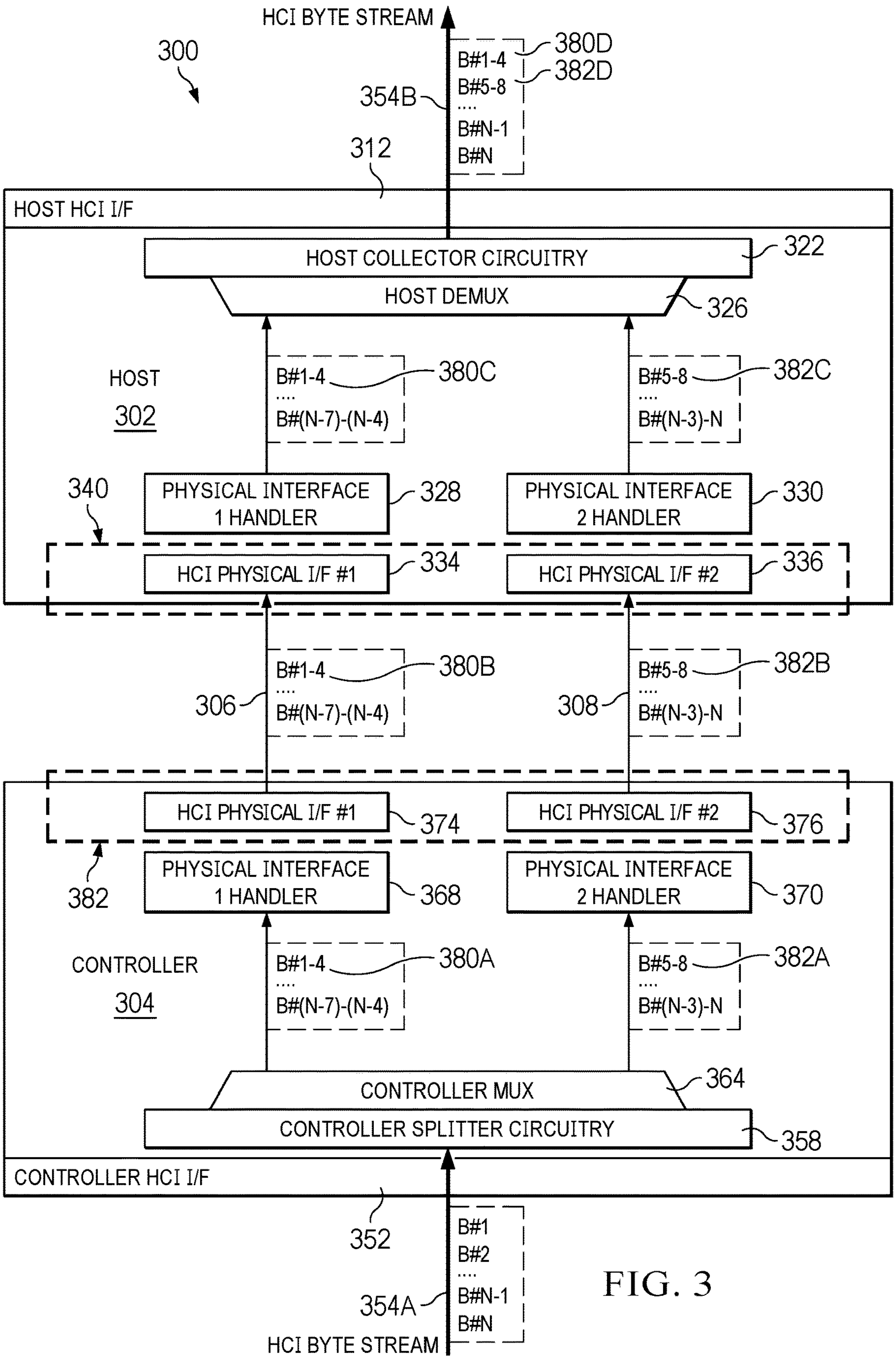

FIG. 3 is a block diagram of an example Bluetooth device 300, e.g., which may advantageously improve (e.g., increase information throughput capabilities) HCI communication when both the host and the controller are configured with the example multi byte-level service policy. The example device 300 of FIG. 3 includes similar structure as described above in connection with FIG. 2 and will refer to similar reference numbers using a prefix "3 XX" where appropriate.

In some examples, the example input HCI bytes 354A may include any number of bytes that are an input to the example controller splitter 358. The fixed multi byte-level service policy causes transmission of a fixed quantity of bytes via the first physical link 306 and its associated chain of structure (e.g., the example first controller physical I/F handler 368, the example first controller HCI I/F 374, the example first host HCI I/F 334, and the example first host physical I/F handler 328). The fixed multi byte-level service policy may also cause transmission in an alternate iteration (e.g., round-robin) of a subsequent fixed quantity of bytes via the second physical link 308 and its associated chain of structure (e.g., the example second controller physical I/F handler 370, the example second controller HCI I/F 376, the example second host HCI I/F 336, and the example second host physical I/F handler 330). Regardless of the quantity of fixed bytes to be transmitted per iteration of the round-robin, the example host 302 and controller 304 coordinate on that particular quantity prior to the beginning of any communication therebetween.

In the illustrated example of FIG. 3, the fixed quantity of bytes transmitted in the round-robin manner is four (4). For instance, a first iteration of round-robin transmission via the first physical link 306 includes bytes one through four (B #1-4) 380A and a second iteration of round-robin transmission via the second physical link 308 includes bytes five through eight (B #5-8) 382A. Similarly, a third iteration of round-robin transmission occurs again via the first link 306 for bytes nine through twelve (B #9-12) and a fourth iteration of round-robin transmission occurs via the second physical link 308 for bytes thirteen through sixteen (B #13-16). As shown in the illustrated example of FIG. 3, the input HCI bytes 354A are initially split by the controller splitter 358 as a transmission group of bytes one through four (B #1-4) 380A. The transmission group of B #1-4 380A propagate through the example first controller physical I/F handler 368 (e.g., a UART) to the example first controller HCI I/F 274 (see B #1-4 380B). The transmission group of B #1-4 380B propagate through the example first host HCI I/F 334 and the example first host physical I/F handler 328 (see B #1-4 380C), and finally become reconstituted by the example host collector circuitry 322 with the fixed blocks propagating via the second physical link 308 (see B #1-4 380D and B #5-8 382D). While the illustrated example of FIG. 3 includes a fixed amount of four (4) bytes, examples disclosed herein are not limited thereto and any other quantity of bytes may be realized.

Figure 4:
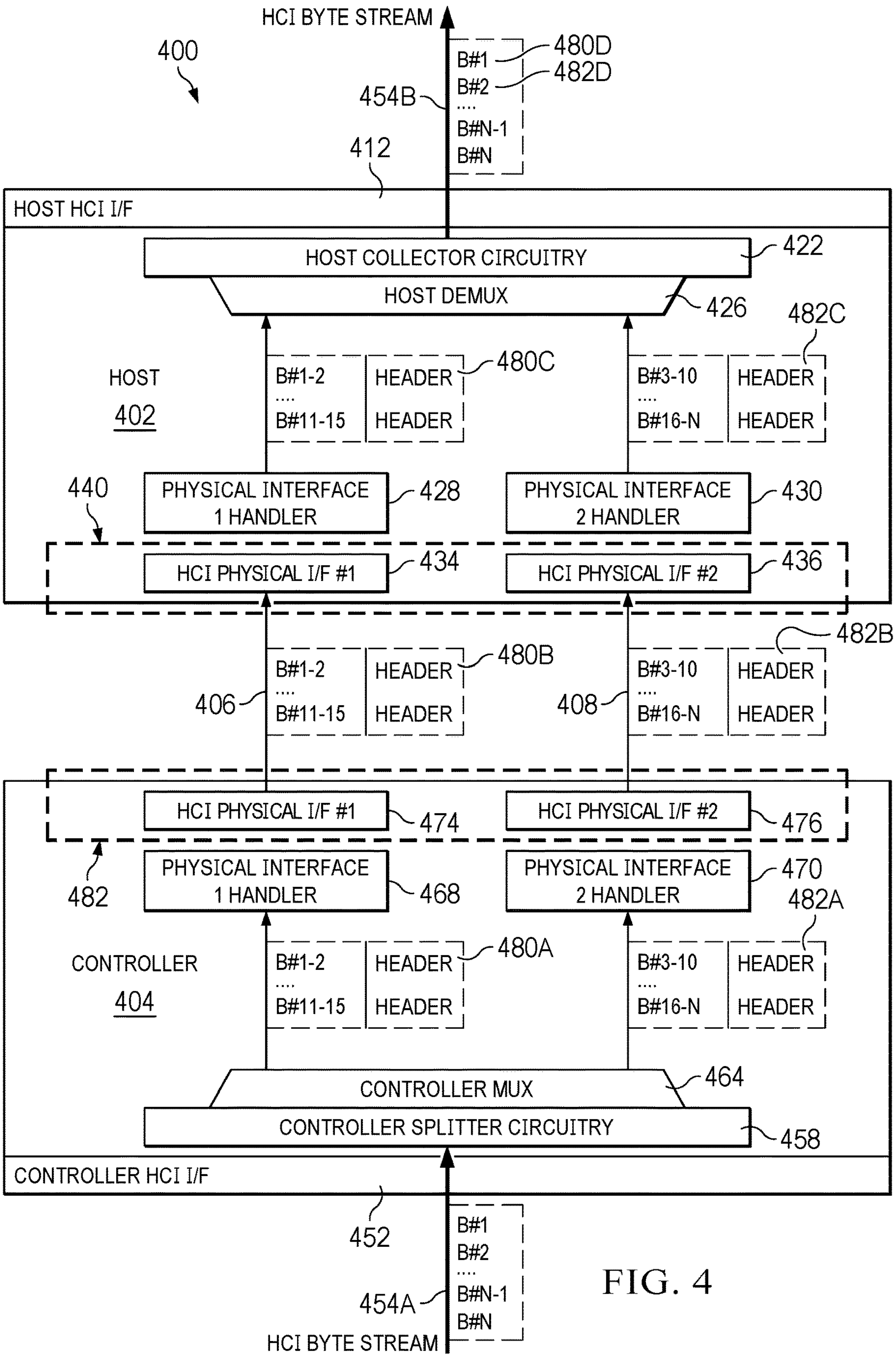

FIG. 4 is a block diagram of an example Bluetooth device 400, e.g., which may advantageously improve (e.g., increase information throughput capabilities) HCI communication when both the host and the controller are configured with the example variable multi byte-level service policy. The example device 400 of FIG. 4 includes similar structure as described above in connection with FIGS. 2 and 3 and will refer to similar reference numbers using a prefix "4XX" where appropriate. While the illustrated example of FIG. 3 (the fixed multi byte-level service policy) sent a fixed and known quantity of bytes from the example controller to the example host, the example variable multi byte-level service policy illustrated in FIG. 4 does not predetermine a quantity of bytes to transmit prior to each iteration of a round-robin process. The example HCI bytes 454A are divided in a manner to cause, in a first round-robin iteration, bytes 1 and 2 (e.g., a quantity of two bytes) to be sent via the example first physical link 406, and an alternate quantity of bytes 3 through 10 (e.g., a quantity of eight bytes) to be sent via the example second physical link 408. Additionally, in a second round-robin iteration bytes 11 through 15 (e.g., a quantity of five bytes) are sent via the example first physical link 406 and bytes 16 through n are sent via the example second physical link 408. However, because the particular bytes and/or byte quantities are not predetermined before the example controller 404 begins communicating with the example host 402, the illustrated example of FIG. 4 implements a header (e.g., a flow control header) in each transmission from the controller 404, e.g., to indicate the number of bytes in the transmission.

In operation, in some examples, the example controller splitter circuitry 458 generates a first header 480A (e.g., a first flow control header, such as a data structure) containing information indicative of (a) which bytes are being sent and (b) the total quantity of bytes being sent over the link of interest (e.g., the first physical link 406). In this particular example, the first header 480A identifies bytes #1 and #2 are being sent and a quantity of 2. Similarly, the controller splitter circuitry 458 generates a second header 482A containing information that the second physical link 208 will transmit bytes #3 through #10, which is a total quantity of eight bytes. When the example first header 480A and the example second header 482A reach the host collector circuitry 422 (see 480C and 482C), the example host collector circuitry 422 reconstitutes and/or otherwise rearranges the transmission to combine the payload data of all ten bytes transmitted for that particular iteration (e.g., bytes 1 through 10). In some examples, an input data stream includes non-consecutive data (e.g., bytes and/or packets having numerical designations that are not in a consecutive order), which may be an unintentional effect of buffer overflow/underflow and/or particular paths being faster than others. In some examples, the splitter circuitry utilizes the header information to reconstruct, rebuild and/or otherwise reconstitute an order of the output data stream to match the input data stream. As such, because the headers facilitate an ability to rebuild and/or otherwise reconstitute bytes (e.g., or packets) in their correct order, future iterations along the example first physical link 406 and the example second physical link 408 may have varying quantities of bytes sent.

Figure 5:
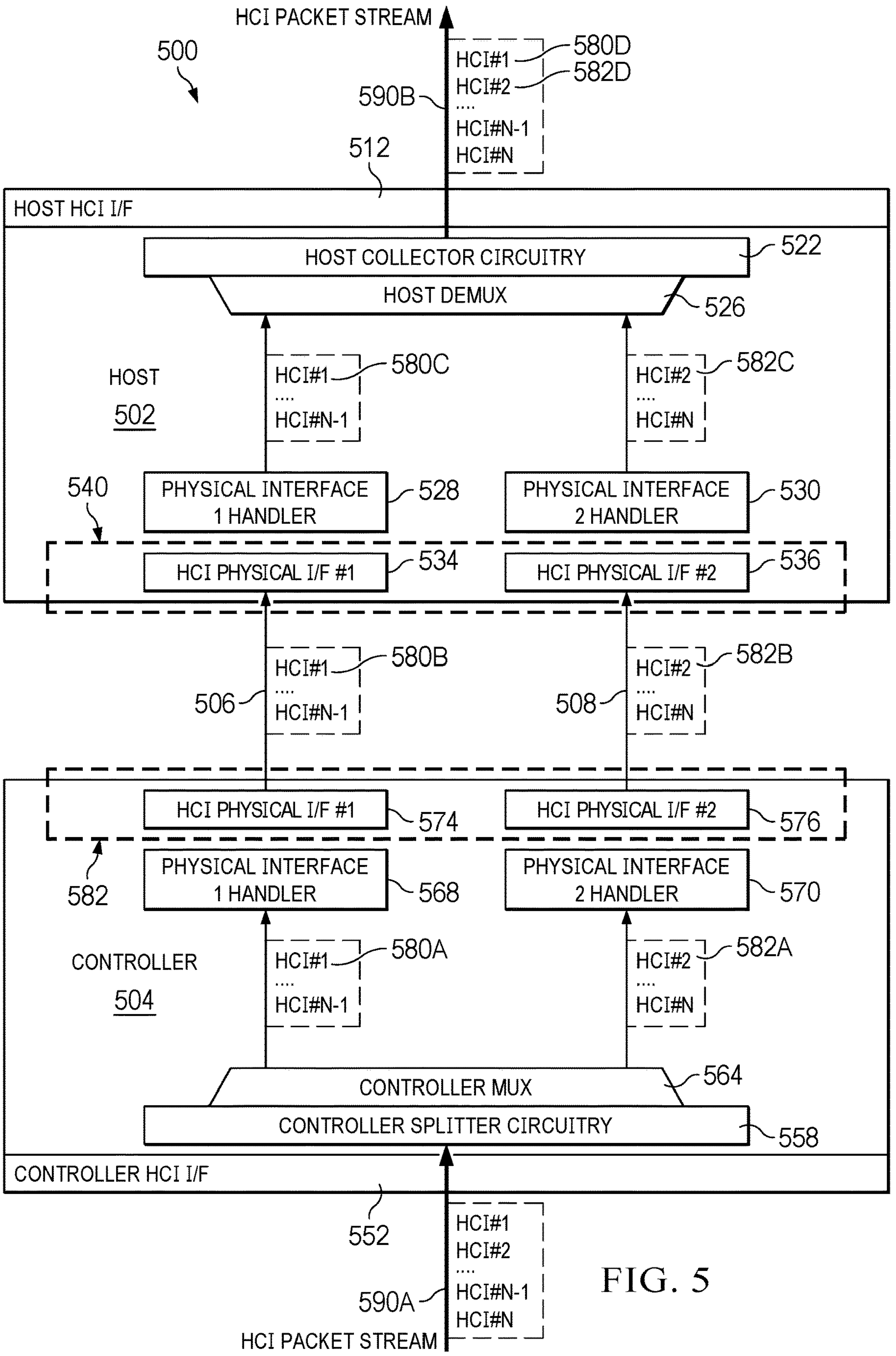

FIG. 5 is a block diagram of an example Bluetooth device 500, e.g., which may advantageously improve (e.g., increase information throughput capabilities) HCI communication when both the host and the controller are configured with the example single HCI packet level service policy. The example device 500 of FIG. 5 includes similar structure as described above in connection with FIGS. 2, 3 and 4 and will refer to similar reference numbers using a prefix "5XX" where appropriate. Unlike the illustrated examples of FIGS. 2, 3 and 4, the illustrated example of FIG. 5 includes input HCI packets 590A rather than input HCI bytes. The single HCI packet level service policy causes transmission of a single packet via the first physical link 506 (e.g., HCI packet 580A) and its associated chain of structure, in which the HCI packet may have varying HCI packet sizes. The single HCI packet level service policy operates in an alternate iteration (e.g., round-robin) where a subsequent HCI packet (e.g., HCI packet 582A) is sent via the second physical link 508 and its associated chain of structure. HCI packets that propagate along the first physical link 506 and the second physical link 508 are demultiplexed by the example host DEMUX 526 to allow the host collector circuitry 522 to reconstitute the transmitted packets as an output HCI packet stream (see 580D and 582D).

Figure 6:
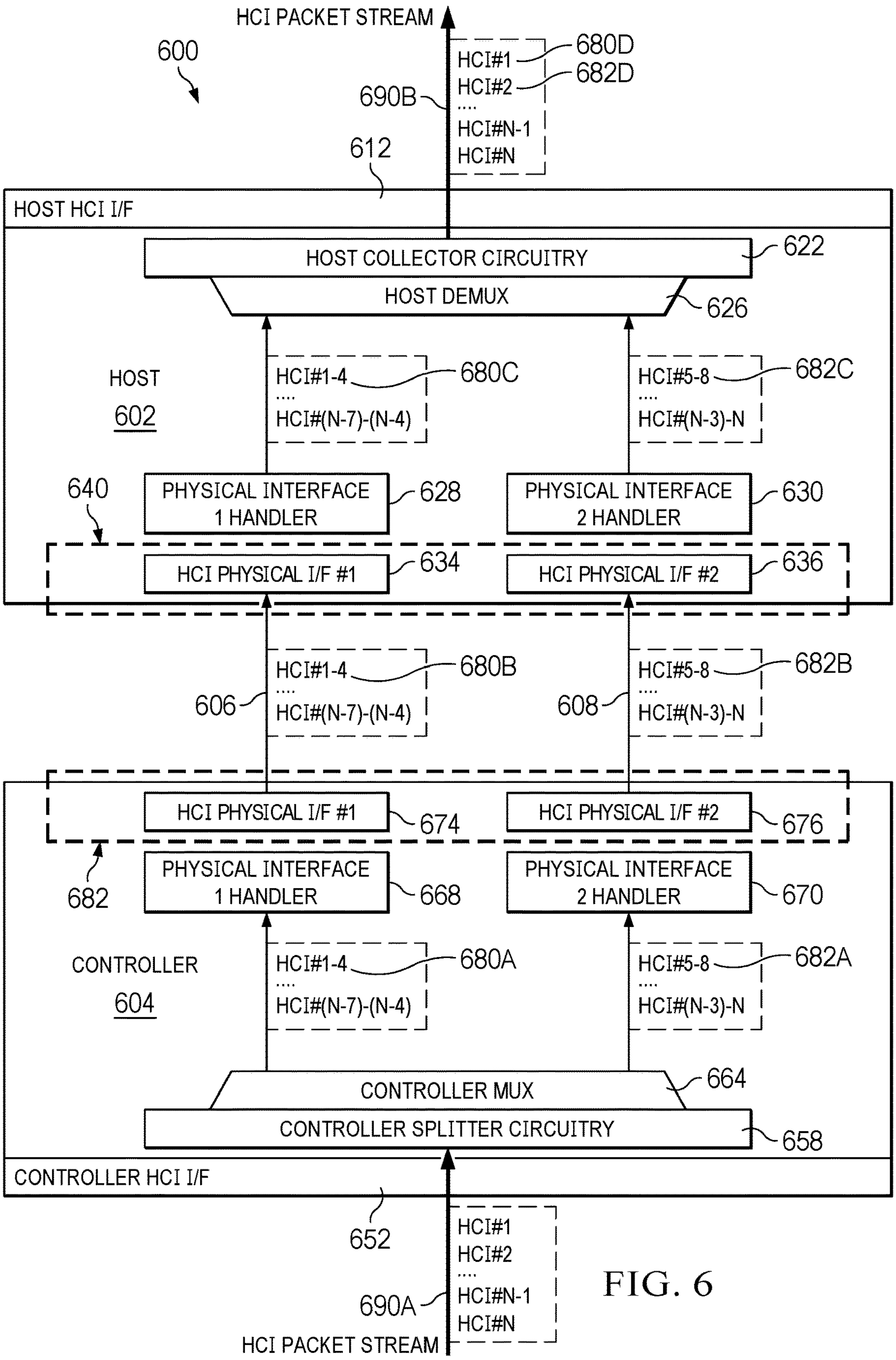

FIG. 6 is a block diagram of an example Bluetooth device 600, e.g., which may advantageously improve (e.g., increase information throughput capabilities) HCI communication when both the host and the controller are configured with the example fixed multi packet-level service policy. The example device 600 of FIG. 6 includes similar structure as described above in connection with FIGS. 2-5 and will refer to similar reference numbers using a prefix "6XX" where appropriate. In the illustrated example of FIG. 6, the HCI packets 690A are sent by the example controller 604 to the example host 602 in a fixed quantity of packets. The fixed quantity of packets may be established between the controller 604 and the host 602 prior to the communication effort so that the receiving device (e.g., in this case the host 602) can determine when a particular packet transmission effort is complete. Quantities of HCI packets are sent in a round-robin manner with a first quantity of packets sent via the example first physical link 606 (and its associated structure) and a second quantity of packets sent via the example second physical link 608 (and its associated structure).

In the illustrated example of FIG. 6, a first quantity of four (4) HCI packets HCI #1-4 680A is sent via the example first physical link 606. HCI packets HCI #1-4 680B is sent from the example first controller HCI I/F 674, and HCI packets HCI #1-4 680C is sent from the example first host physical I/F handler 628 to the host DEMUX 626. Similarly, a second quantity of four (4) HCI packets HCI #5-8 682A is sent via the example second physical link 608. HCI packets HCI #5-8 682B is sent from the example second controller HCI I/F 676, and HCI packets HCI #5-8 682C is sent from the example second host physical I/F handler 630 to the host DEMUX 626. Because the example host collector circuitry 622 operates in a coordinated manner with the controller 604 based on the fixed multi HCI packet service policy, the host collector circuitry 622 reconstitutes the packets in a correct order of HCI #1-8 (see 680D and 682D).

Figure 7:
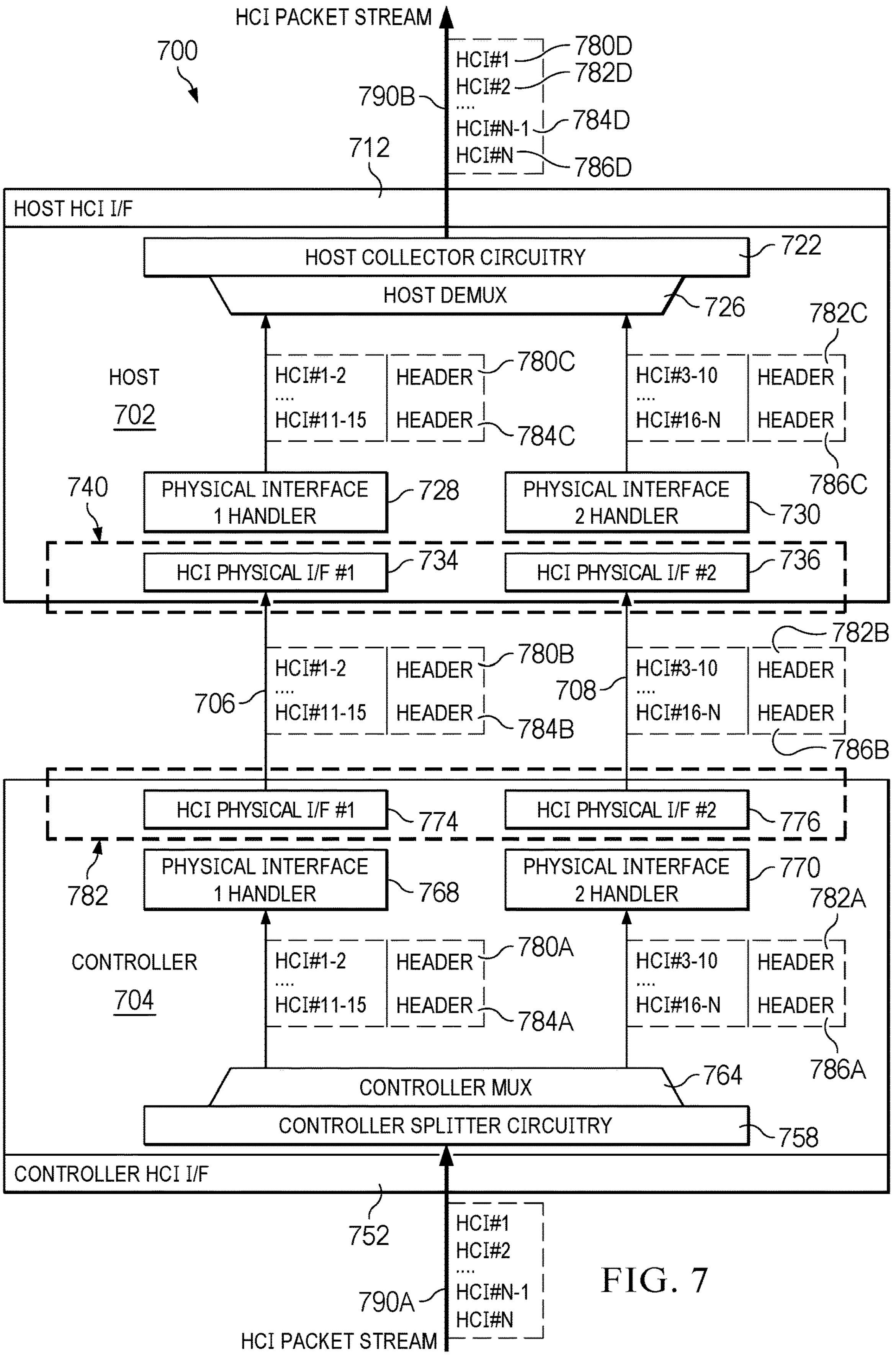

FIG. 7 is a block diagram of an example Bluetooth device 700, e.g., which may advantageously improve (e.g., increase information throughput capabilities) HCI communication when both the host and the controller are configured with the example variable multi packet-level service policy. The example device 700 of FIG. 7 includes similar structure as described above in connection with FIGS. 2-6 and will refer to similar reference numbers using a prefix "7XX" where appropriate. Similar to the illustrated example of FIG. 4 above, the variable multi packet-level service policy illustrated in FIG. 7 does not predetermine a quantity of HCI packets to transmit prior to each iteration of a round-robin process. The example HCI packets 790A are divided in a manner to cause, in a first round-robin iteration, packets 1 and 2 (e.g., a quantity of two HCI packets) to be sent via the example first physical link 706. However, the example second physical link 708 sends an alternate quantity of HCI packets during that round-robin iteration (e.g., packets 3 through 10, a quantity of 8 HCI packets).

While the first iteration of the round-robin has a particular quantity of HCI packets sent on each link, a second iteration of a round-robin may have a different quantity of HCI packets to be sent over the example links. As such, during the first iteration of the round-robin packets 1 and 2 are sent with a header 780A, e.g., to identify to any receiving collector circuitry the proper payload size. Similarly, the second half of the first iteration of the round-robin packets 3 through 10 are sent with a header 782A. During a second round-robin iteration, the illustrated example of FIG. 7 is configured to send HCI #11-15 with a corresponding header 784A and to send HCI #16-N with a corresponding header 786A.

When any HCI packets arrive at the example host collector circuitry 722, the host collector circuitry 722 parses and/or otherwise reads the corresponding header so that the sent HCI packets can be reconstituted in their original and/or otherwise proper order.

Examples disclosed herein may also advantageously improve HCI communication by facilitating aggregation flow control. Generally speaking, some communication attempts may exhibit circumstances (e.g., errors, physical interface transmit/receive buffer overflows, logical interface transmit/receive buffer overflows, etc.) that prevent data from reaching its intended destination. For example, a UART may exhibit and/or otherwise signal a UART FIFO full condition that, if ignored by a sending device will result in sent data being lost. Examples disclosed herein may facilitate aggregation flow control to handle such circumstances (e.g., anomalies) in a manner that reduces lost data occurrences or improved utilization of available resources. Receiving side entities (e.g., collector circuitry, receiving-side physical I/F handlers, etc.) may employ different aggregation flow reporting techniques to sending side entities (e.g., splitter circuitry, sending-side physical I/F handlers, etc.) to report and/or otherwise inform the sending side entities of different transaction status conditions.

Figure 8:
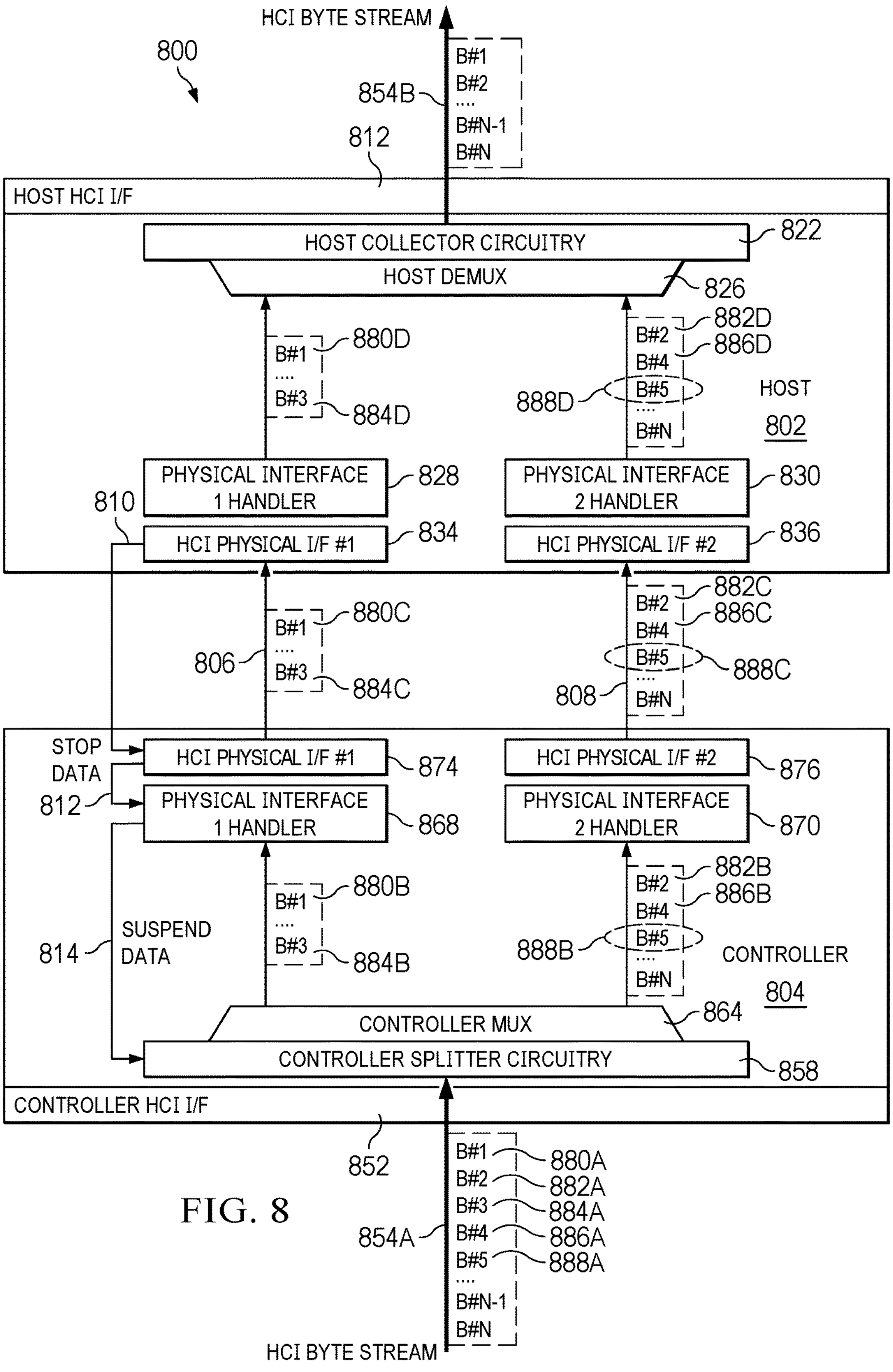
FIGS. 8, 9, 10A, 10B, 11A and 11B are block diagrams of example portions of Bluetooth devices disclosed herein having particular aggregation flow control configurations.

FIG. 8 is a block diagram of an example Bluetooth device 800, e.g., which may advantageously improve (e.g., increase information throughput capabilities) HCI communication aggregation flow control at a physical interface level. The example device 800 of FIG. 8 includes similar structure as described above in connection with FIGS. 2-7 and will refer to similar reference numbers using a prefix “8XX” where appropriate.

In operation, bytes of the example HCI byte stream 854A are split by the example controller splitter circuitry 858 so that odd-numbered bytes are transmitted via the first physical link 806 and its associated structure, and even-numbered bytes are transmitted via the second physical link 808 and its associated structure. In particular, the controller splitter circuitry 858 transmits a first byte (B #1) 880A to the first controller physical I/F handler 868 (see B #1 880B) via the controller MUX 864, and transmits a second byte (B #2) 882A to the second controller physical I/F handler 870 (see B #2 882B). In normal operation, the odd-numbered bytes and the even-numbered bytes may propagate along the first physical link 806 and the second physical link 808, respectively, until they reach the example host DEMUX 826 and host collector circuitry 822 where the HCI byte stream can be reconstituted in a manner that reflects its original order.

While the example first byte B #1 880D and the example third byte B #3 884D successfully reached the host DEMUX 826, the example first host HCI I/F 834 generates a flow control signal 810 (e.g., a hardware flow control signal, a software flow control signal, physical interface flow control signaling, etc.) to indicate that a condition (e.g., an error, a buffer overflow, or other problem) exists. In some examples, the hardware flow control signal 810 is a UART FIFO full condition generated by a UART, but, in some examples, not all physical interface handlers include such capabilities. In some examples, the hardware flow control signal is an interface report indicative of a status of an interface and/or physical interface handler. As described in further detail below, the interface report (e.g., a stop data signal, a suspend data signal, a congestion signal/flag, etc.) is propagated back to a sending device to cause the sending device to augment its transmission behavior while an error condition is true. The example hardware flow control signal 810 is transmitted by the example first host HCI I/F 834 to the example first controller HCI I/F 874, which generates a stop data signal 812. The example first controller HCI I/F 874 transmits the stop data signal 812 to the example first controller physical I/F handler 868, which generates a suspend data signal 814 that is transmitted to the example controller splitter circuitry 858.

In response to receiving the example suspend data signal 814, the example controller splitter circuitry 858 may prevent any further data (e.g., bytes of the example HCI byte stream 854A) from being transmitted via the example first physical link 806. While the example controller splitter circuitry 858 was previously configured to transmit all odd-numbered bytes via the first physical link 806, the suspend data signal 814 causes the controller splitter circuitry 858 to reroute and/or otherwise redirect all traffic to one or more of any remaining links, such as the example second physical link 808. To illustrate, an example fifth byte B #5 888A from the example HCI byte stream 854A is transmitted by the controller splitter circuitry 858 via the example second physical link 808 and its associated structure. In particular, the example controller splitter circuitry 858 transmits the fifth byte B #5 888B to the example second controller physical I/F handler 870, then to the example second host HCI I/F 836 (see B #5 888C), and further to the example host collector circuitry 822 (see B #5 888D). In some examples, and in response to instantiating an augmented manner of data propagation, the example first host HCI I/F 834 back-propagates one or more signals to the example host DEMUX 826 and/or the example host collector circuitry 822 with an indication not to expect further data via the affected first physical link 806 and/or structure associated therewith. However, if and when circumstances change where the prior error or buffer overflow condition is gone, the example first host HCI I/F 834 may back-propagate one or more signals to the example host DEMUX 826 and/or the example host collector circuitry 822 with an indication that the normal (e.g., default or prior) manner of communication is to resume.

In some examples, the hardware flow control signal 810, the stop data signal 812 and the suspend data signal 814 remain true until the example first host HCI I/F 834 determines that the condition (e.g., error) has stopped (e.g., an example UART FIFO full condition is false). As a result, in some examples, a false value is generated by the example first host HCI I/F 834 and is propagated to the example controller splitter circuitry 858 so that normal byte splitting configuration behaviors may continue (e.g., transmit all odd-numbered bytes via the first physical link 806 and all even-numbered bytes via the second physical link 808). Similarly, and as described above, the example first host HCI I/F 834 back-propagates one or more signals to the example host DEMUX 826 and/or the example host collector circuitry 822 with an indication that the normal (e.g., default or prior) manner of communication is to resume.

Figure 9:
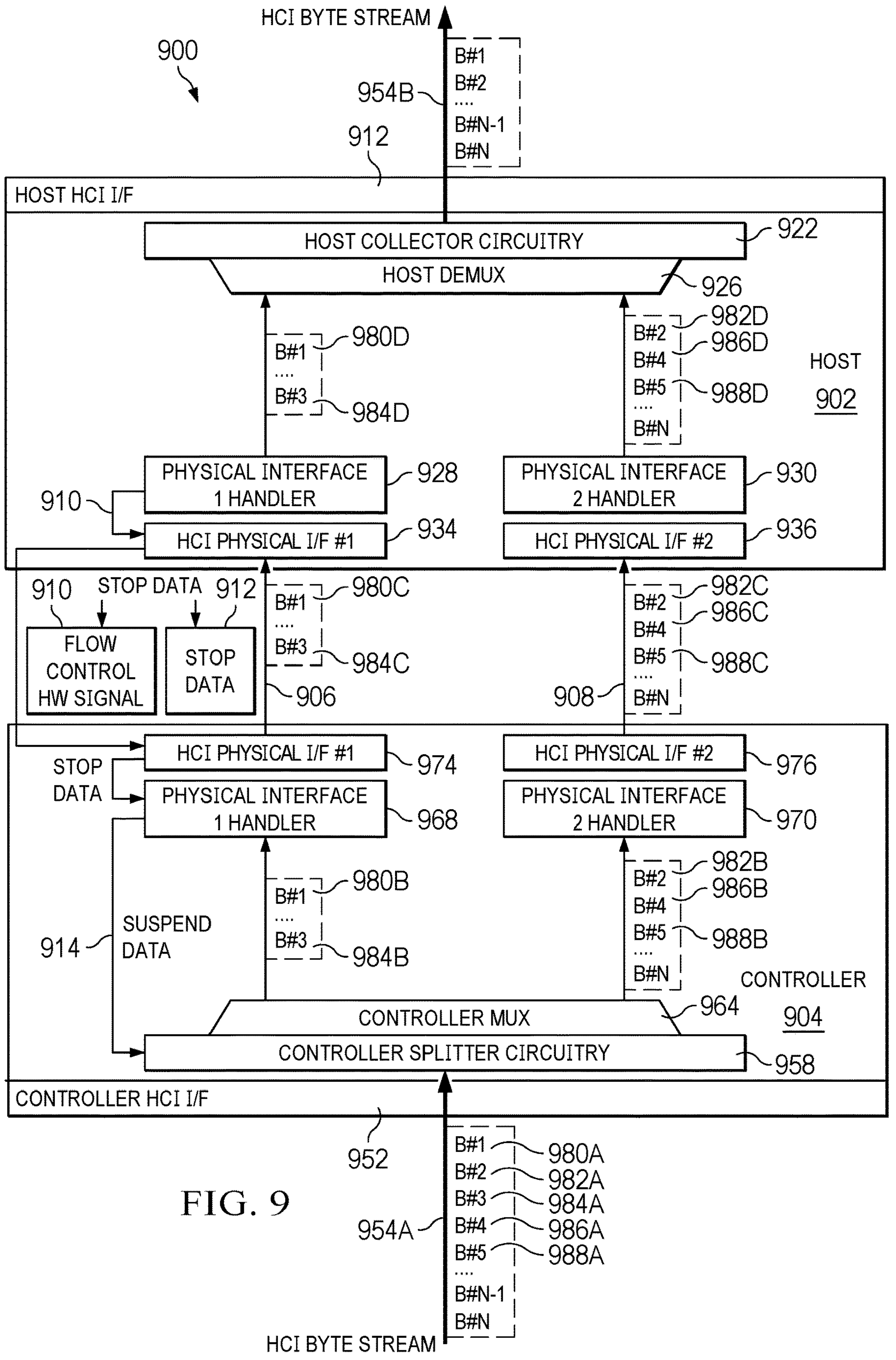

FIG. 9 is a block diagram of an example Bluetooth device 900, e.g., which may advantageously improve (e.g., increase information throughput capabilities) HCI communication aggregation flow control at a physical interface handler level. The example device 900 of FIG. 9 includes similar structure as described above in connection with FIGS. 2-8 and will refer to similar reference numbers using a prefix “9XX” where appropriate.

In operation, and similar to the illustrated example of FIG. 8, bytes of the example HCI byte stream 954A are split by the example controller splitter circuitry 958 so that odd-numbered bytes are transmitted via the first physical link 906 and its associated structure, and even-numbered bytes are transmitted via the second physical link 908 and its associated structure. In particular, the controller splitter circuitry 958 transmits a first byte (B #1) 980A to the first controller physical I/F handler 968 (see B #1 980B) via the controller MUX 964, and transmits a second byte (B #2) 982A to the second controller physical I/F handler 970 (see B #2 982B). In normal operation, the odd-numbered bytes and the even-numbered bytes may propagate along the first physical link 906 and the second physical link 908, respectively, until they reach the example host DEMUX 926 and host collector circuitry 922 where the HCI byte stream can be reconstituted in a manner that reflects its original order.

While the example first byte B #1 980D and the example third byte B #3 984D successfully reached the host DEMUX 926, the example first host physical I/F handler 928 generates a stop data message 910 to indicate that an error or other problem exists. Thus, unlike the illustrated example of FIG. 8 in which the example first host HCI I/F 934 generated the indication of a problem or error, the illustrated example of FIG. 9 includes such error generation by the example first host physical I/F handler 928. As described above, some structure may have particular capabilities for hardware flow control signaling capabilities, while other structure may not have such capabilities. Accordingly, some examples disclosed herein facilitate a manner of error notification in various scenarios where structure does or does not have hardware flow control capabilities. In some examples, the first host physical I/F handler 928 generates the error (stop data message 910) based on a detected queue full condition. However, examples disclosed herein include any other type of condition that may warrant a change in flow control.

In some examples, the stop data message 910 is translated into a physical interface hardware flow control signal 912, and in some examples the stop data message 910 is transmitted without modification to the example first controller HCI I/F 974. The example first controller HCI I/F 974 transmits the stop data message 910 (or the example translated hardware flow control signal 912) to the example first controller physical I/F handler 968, which sends a suspend data message 914 to the example controller splitter circuitry 958 to augment and/or otherwise prevent further bytes from being transmitted via the first physical link 906. Further transmission then operates in a manner similar to that described above in connection with FIG. 8 until the example error message is de-asserted and/or otherwise set as false. For instance, and as described above in connection with FIG. 8, one or more signals may be back-propagated to the controller to communicate the change in flow control.

Figure 10A:
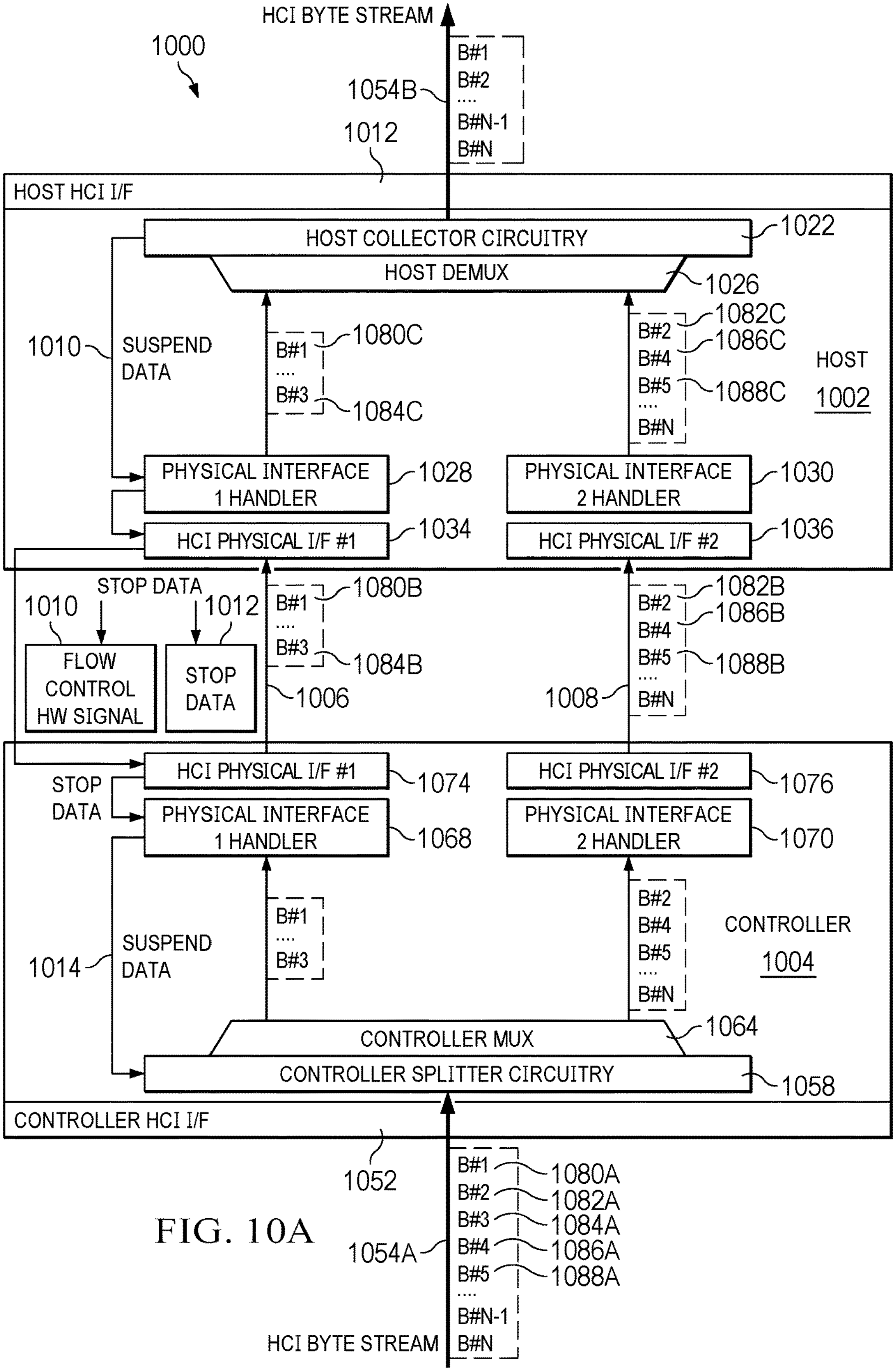

FIG. 10A is a block diagram of an example Bluetooth device 1000, which may advantageously improve (e.g., increase information throughput capabilities) HCI communication aggregation flow control at a splitter/collector level. The example device 1000 of FIG. 10A includes similar structure as described above in connection with FIGS. 2-9 and will refer to similar reference numbers using a prefix "10XX" where appropriate.

The illustrated example of FIG. 10A is substantially similar to that described in connection with FIG. 9, except that the origin of the error signal comes from the example host collector circuitry 1022. In operation the example controller splitter circuitry 1058 splits bytes of the example HCI byte stream 1054A so that odd-numbered bytes are transmitted via the first physical link 1006 and its associated structure, and even-numbered bytes are transmitted via the second physical link 1008 and its associated structure. In particular, the controller splitter circuitry 1058 transmits a first byte (B #1) 1080A to the first controller physical I/F handler 1068 (see B #1 1080B) via the controller MUX 1064, and transmits a second byte (B #2) 1082A to the second controller physical I/F handler 1070 (see B #2 1082B). In normal operation, the odd-numbered bytes and the even-numbered bytes propagate along the first physical link 1006 and the second physical link 1008, respectively, until they reach the example host DEMUX 1026. The host collector circuitry 1022 then reconstitutes the HCI byte stream in a manner that reflects its original order.

While the example first byte B #1 1080D and the example third byte B #3 1084D successfully reached the host DEMUX 1026, the example host collector circuitry 1022 generates a suspend data message 1010 and transmits the same to the example first host physical I/F handler 1028 to indicate that an error or other problem is occurring. The example indication of an error (e.g., the suspend data message 1010) is ultimately propagated to the example controller splitter circuitry 1058 in the same manner as discussed in connection with FIG. 9. As such, the controller splitter circuitry 1058 augments the manner of transmitting bytes from the example HCI byte stream 1054A so that the affected link (e.g., the first physical link 1006 and its associated structure) is not used for transmission purposes.

Figure 10B:
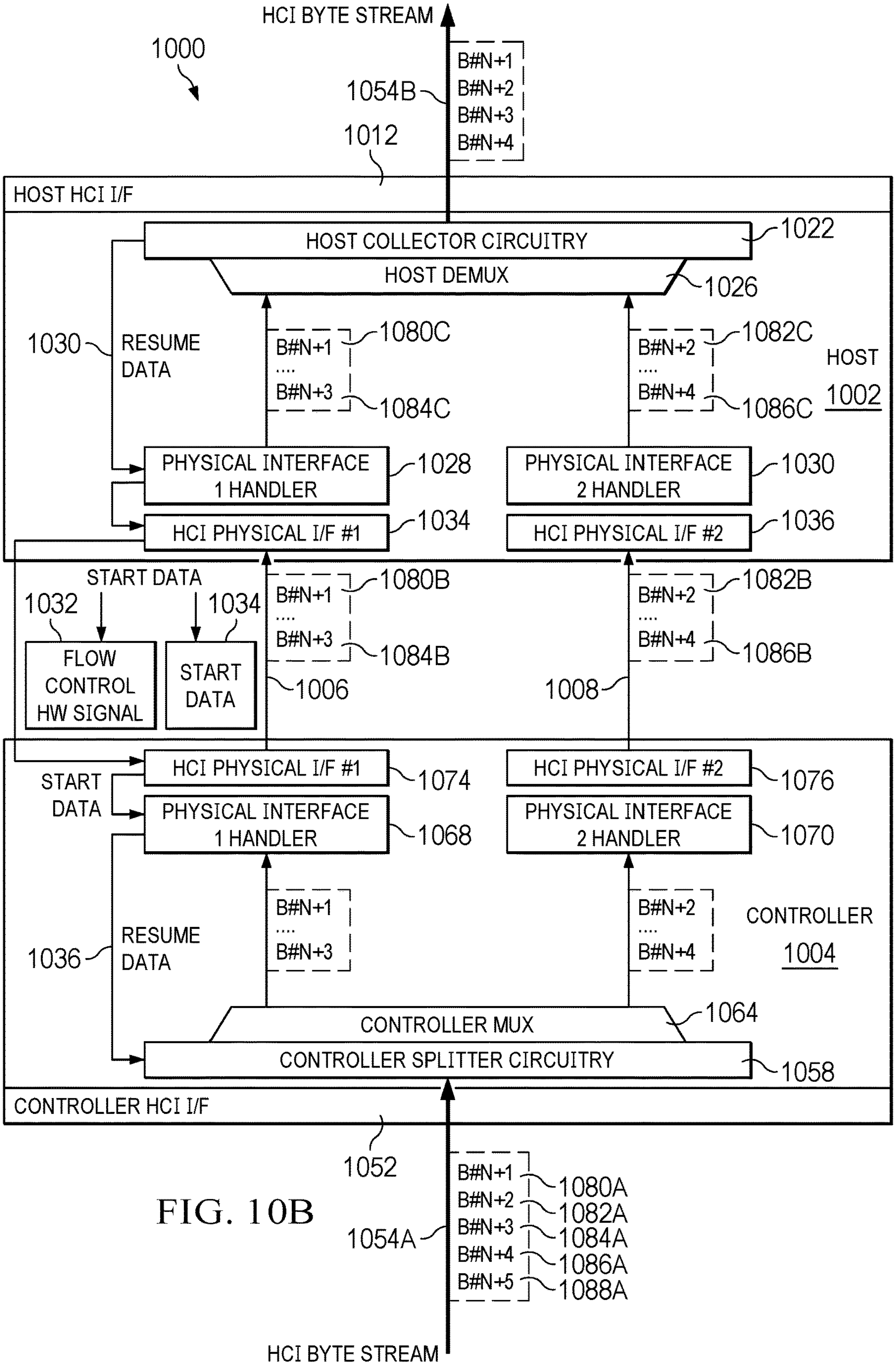

FIG. 10B is a block diagram of an alternate description of the example Bluetooth device 1000 of FIG. 10A, e.g., which may advantageously improve (e.g., increase information throughput capabilities) HCI communication aggregation flow control at the splitter/collector level. The example device 1000 of FIG. 10B includes the same structure as described in FIG. 10A and will refer to similar reference numbers where appropriate. In the illustrated example of FIG. 10B, the example host collector circuitry 1022 determines that the previous condition (e.g., an error, a buffer overflow, etc.) is no longer present for the example first physical link 1006 and/or its associated structure. In some examples the host collector circuitry 1022 monitors capacity metrics corresponding to one or more of the example host DEMUX 1026, the first host physical I/F handler 1028 and/or the first host HCI I/F 1034 (e.g., a buffer full metric/message). In the event the capacity metrics indicate that there are no errors, the host collector circuitry 1022 transmits a resume data message 1030 to the example first host physical I/F handler 1028.

In some examples, the example first host HCI I/F 1034 translates the resume data message 1030 to a physical interface hardware flow control start data signal 1032, and in some examples the resume data message 1030 is transmitted without modification as a start data signal 1034 to the example first controller HCI I/F 1074. The example first controller HCI I/F 1074 transmits the start data message to the example first controller physical I/F handler 1068, which transmits a resume data message 1036 to the example controller splitter circuitry 1058 to augment and/or otherwise permit bytes to be transmitted from the example HCI byte stream 1054A via the example first physical link 1006. In other words, the example resume data message 1036 causes the controller splitter circuitry 1058 to resume transmitting odd-numbered bytes via the first physical link 1006 and even-numbered bytes via the second physical link 208.

Figure 11A:
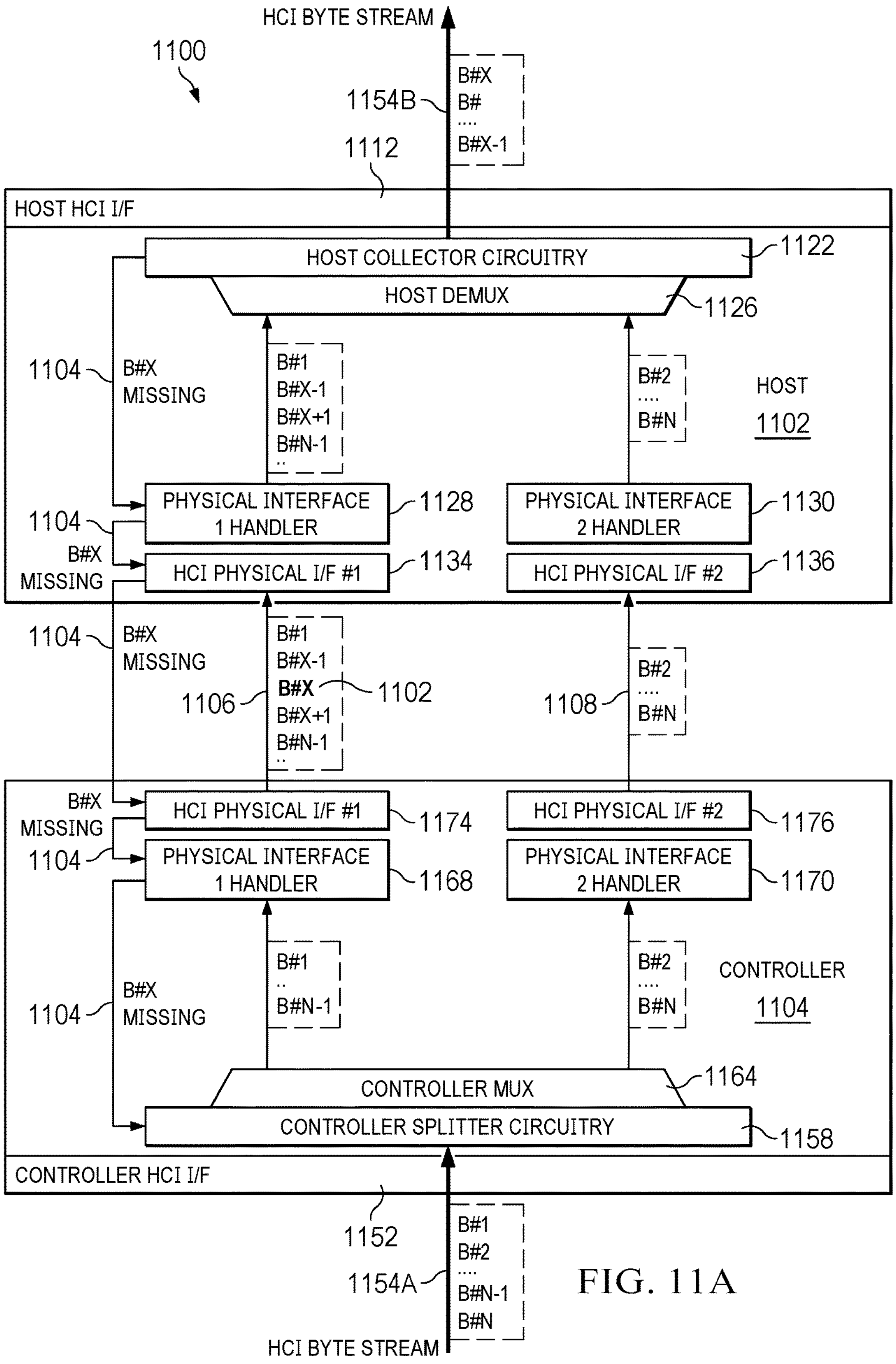

FIG. 11A is a block diagram of an example Bluetooth device 1100, e.g., which may advantageously improve (e.g., increase information throughput capabilities) HCI communication aggregation flow control in connection with missing data occurrences. The example device 1100 of FIG. 11A includes similar structure as described above in connection with FIGS. 2-10A and 10B, and will refer to similar reference numbers using a prefix "11XX" where applicable.

The illustrated example of FIG. 11A addresses circumstances in which expected data is not received and a corresponding technique to acquire the missing data. For the sake of illustration, the example host 1102 and controller 1104 may operate in a round-robin manner to transmit odd-numbered bytes over the example first physical link 1106 and even-numbered bytes over the example second physical link 1108. However, some examples corresponding to FIG. 11A may apply to other data transmission service policies. For the sake of example, byte B #X 1102 was lost after transmission from the example controller 1104. Because the example host collector circuitry 1172 expects B #X 1102 but did not receive it (e.g., after a threshold period of time, after an out-of-order byte arrives), the host collector circuitry 1172 sends a missing byte message 1104 to the sending entity to inform it of the missing data with a request to re-send. In some examples, the missing byte message 1104 identifies a payload of a byte number that is missing (e.g., B #5 was expected, but not received before B #7 arrived, or B #5 was expected within a threshold period of time, but not received). The missing byte message 1104 is transmitted and/or otherwise propagated to the controller splitter circuitry 1158 to augment its behavior. In particular, the missing byte message 1104 causes the controller splitter circuitry to parse the message 1104 and identify the corresponding byte number (e.g., a byte sequence identifier, such as B #3), and re-sends the corresponding missing byte back to the example host collector circuitry 1122, as described in connection with example FIG. 11B. In some examples, and similar to the illustrated example of FIG. 8, signals corresponding to an augmented manner of flow control are backpropagated to one or more of the host DEMUX 1126 and/or the host collector circuitry 1122.

Figure 11B:
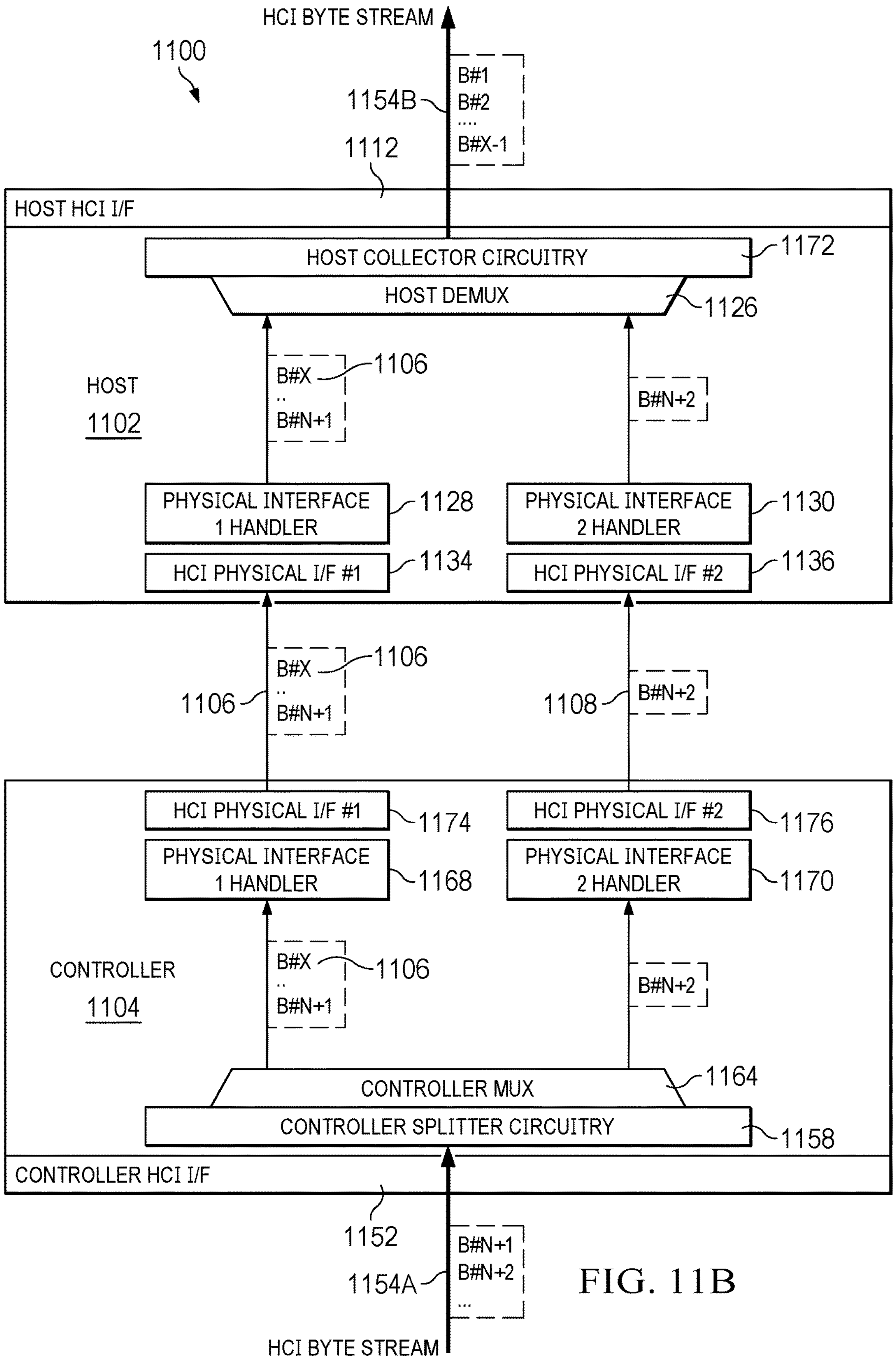

FIG. 11B is a block diagram of an alternate description of the example Bluetooth device 1100 of FIG. 11A, e.g., which may advantageously improve (e.g., increase information throughput capabilities) HCI communication aggregation flow control at the splitter/collector level. The example device 1100 of FIG. 11B includes the same structure as described in FIG. 11A and will refer to similar reference numbers where appropriate. In the illustrated example of FIG. 11B, the example controller splitter circuitry 1158 re-sends missing B #X 1106 in response to receiving the missing byte message 1104. The missing B #X 1106 byte is ultimately transmitted and/or otherwise propagated to the example host collector circuitry 1122. Once the host collector circuitry 1122 receives the missing byte B #X 1106, the host collector circuitry 1122 resumes normal operation of the odd/even round-robin data transmission protocol.

While FIGS. 1-9, 10A, 10B, 11A and 11B illustrate block diagrams of example implementations of Bluetooth devices to improve HCI communication, the example Bluetooth devices may be instantiated (e.g., creating an instance of, bring into being for any length of time, materialize, implement, etc.) by programmable circuitry such as a Central Processor Unit (CPU) executing first instructions. Additionally or alternatively, the example Bluetooth devices of FIGS. 1-9, 10A, 10B, 11A and 11B may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 1-9, 10A, 10B, 11A and 11B may, thus, be instantiated at the same or different times. Some or all of the circuitry of FIGS. 1-9, 10A, 10B, 11A and 11B may be instantiated, for example, in one or more threads executing concurrently on hardware and/or in series on hardware. Moreover, in some examples, some or all of the circuitry of FIGS. 1-9, 10A, 10B, 11A and 11B may be implemented by microprocessor circuitry executing instructions and/or FPGA circuitry performing operations to implement one or more virtual machines and/or containers.

In some examples, the host splitter circuitry 120 of FIG. 1 (and the host splitter circuitry of FIGS. 2-9, 10A, 10B, 11A and 11B) is instantiated by programmable circuitry executing host splitter instructions and/or configured to perform operations such as those represented by the flowchart(s) of FIGS. 12-16. In some examples, the host collector circuitry 122 of FIG. 1 (and the host collector circuitry of FIGS. 2-9, 10A, 10B, 11A and 11B) is instantiated by programmable circuitry executing host collector instructions and/or configured to perform operations such as those represented by the flowchart(s) of FIGS. 12-16. In some examples, the host selection circuitry 118 of FIG. 1 (and the host selection circuitry of FIGS. 2-9, 10A, 10B, 11A and 11B) is instantiated by programmable circuitry executing host selection instructions and/or configured to perform operations such as those represented by the flowchart(s) of FIGS. 12-16. In some examples, the host communication I/F 142 of FIG. 1 (and the host communication interfaces of FIGS. 2-9, 10A, 10B, 11A and 11B) is instantiated by programmable circuitry executing host communication instructions and/or configured to perform operations such as those represented by the flowchart(s) of FIGS. 12-16. In some examples, the aggregated host physical interface 140 of FIG. 1 (and the host aggregation interfaces of FIGS. 2-9, 10A, 10B, 11A and 11B) is instantiated by programmable circuitry executing host aggregation instructions and/or configured to perform operations such as those represented by the flowchart(s) of FIGS. 12-16.

In some examples, the aggregated controller physical interface 180 of FIG. 1 (and the controller aggregation interfaces of FIGS. 2-9, 10A, 10B, 11A and 11B) is instantiated by programmable circuitry executing controller aggregation instructions and/or configured to perform operations such as those represented by the flowchart(s) of FIGS. 12-16. In some examples, the controller communication interface 182 of FIG. 1 (and the controller communication interfaces of FIGS. 2-9, 10A, 10B, 11A and 11B) is instantiated by programmable circuitry executing controller communication instructions and/or configured to perform operations such as those represented by the flowchart(s) of FIGS. 12-16. In some examples, the controller selection circuitry 158 of FIG. 1 (and the controller selection circuitry of FIGS. 2-9, 10A, 10B, 11A and 11B) is instantiated by programmable circuitry executing controller selection instructions and/or configured to perform operations such as those represented by the flowchart(s) of FIGS. 12-16. In some examples, the controller splitter circuitry 160 of FIG. 1 (and the controller splitter circuitry of FIGS. 2-9, 10A, 10B, 11A and 11B) is instantiated by programmable circuitry executing controller splitter instructions and/or configured to perform operations such as those represented by the flowchart(s) of FIGS. 12-16. In some examples, the controller collector circuitry 162 of FIG. 1 (and the controller collector circuitry of FIGS. 2-9, 10A, 10B, 11A and 11B) is instantiated by programmable circuitry executing controller instructions and/or configured to perform operations such as those represented by the flowchart(s) of FIGS. 12-16.

In some examples, the host splitter circuitry includes a circuit for host splitting, the host collector circuitry includes a circuit for host collecting, the host selection circuitry includes a circuit for host selection, the host communication interface includes a circuit for host communication interfacing, the host aggregation interface includes a circuit for host aggregation interfacing, the controller aggregation interface includes a circuit for controller aggregation interfacing, the controller communication interface includes a circuit for controller communication interfacing, the controller selection circuitry includes a circuit for controller selection, the controller splitter circuitry includes a circuit for controller splitting, and the controller collector circuitry includes a circuit for controller collecting. In some examples, the aforementioned circuitry may be instantiated by programmable circuitry such as the example programmable circuitry 1700 of FIG. 17A, the example programmable circuitry 1700' of FIG. 17B, and/or the example programmable circuitry 1800 of FIG. 18. In some examples, the aforementioned circuitry may be instantiated by hardware logic circuitry, which may be implemented by an ASIC, XPU, or FPGA circuitry configured and/or structured to perform operations corresponding to the machine-readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

While an example manner of implementing the Bluetooth device of FIG. 1 is illustrated in FIGS. 2-9, 10A, 10B, 11A and 11B, one or more of the elements, processes, and/or devices illustrated in FIGS. 1-9, 10A, 10B, 11A and 11B may be combined, divided, re-arranged, omitted, eliminated, and/or implemented in any other way. Further, the example host splitter circuitry, the example host collector circuitry, the example host selection circuitry, the example host communication interface, the example host aggregation interface, the example controller aggregation interface, the example controller communication interface, the example controller selection circuitry, the example controller splitter circuitry, and/or more generally the example controller collector circuitry of FIGS. 1-9, 10A, 10B, 11A and 11B, may be implemented by hardware alone or by hardware in combination with software and/or firmware. Thus, for example, any of the example host splitter circuitry, the example host collector circuitry, the example host selection circuitry, the example host communication interface, the example host aggregation interface, the example controller aggregation interface, the example controller communication interface, the example controller selection circuitry, the example controller splitter circuitry, and/or more generally the example controller collector circuitry of FIGS. 1-9, 10A, 10B, 11A and 11B, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example Bluetooth devices of FIGS. 1-9, 10A, 10B, 11A and 11B may include one or more elements, processes, and/or devices in addition to, or instead of, those illustrated in FIGS. 1-9, 10A, 10B, 11A and 11B, and/or may include more than one of any or all of the illustrated elements, processes and devices.

Flowchart(s) representative of example machine-readable instructions, which may be executed by programmable circuitry to implement and/or instantiate the Bluetooth devices of FIGS. 1-9, 10A, 10B, 11A and 11B and/or representative of example operations which may be performed by programmable circuitry to implement and/or instantiate the Bluetooth devices of FIGS. 1-9, 10A, 10B, 11A and 11B, are shown in FIGS. 12-16. The machine-readable instructions may be one or more executable programs or portion(s) of one or more executable programs for execution by programmable circuitry such as the programmable host processor 1725*a* and/or the controller processor 1723 shown in the example programmable circuitry 1700 discussed below in connection with FIGS. 17A and 17B, and/or the example programmable circuitry as shown in FIG. 18, and/or may be one or more function(s) or portion(s) of functions to be performed by the example programmable circuitry (e.g., an FPGA). In some examples, the machine-readable instructions cause an operation, a task, etc., to be carried out and/or performed in an automated manner in the real world. As used herein, "automated" means without human involvement.

The program(s) may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 12-16, many other methods of implementing the example Bluetooth devices may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 12-16 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

Figure 12:
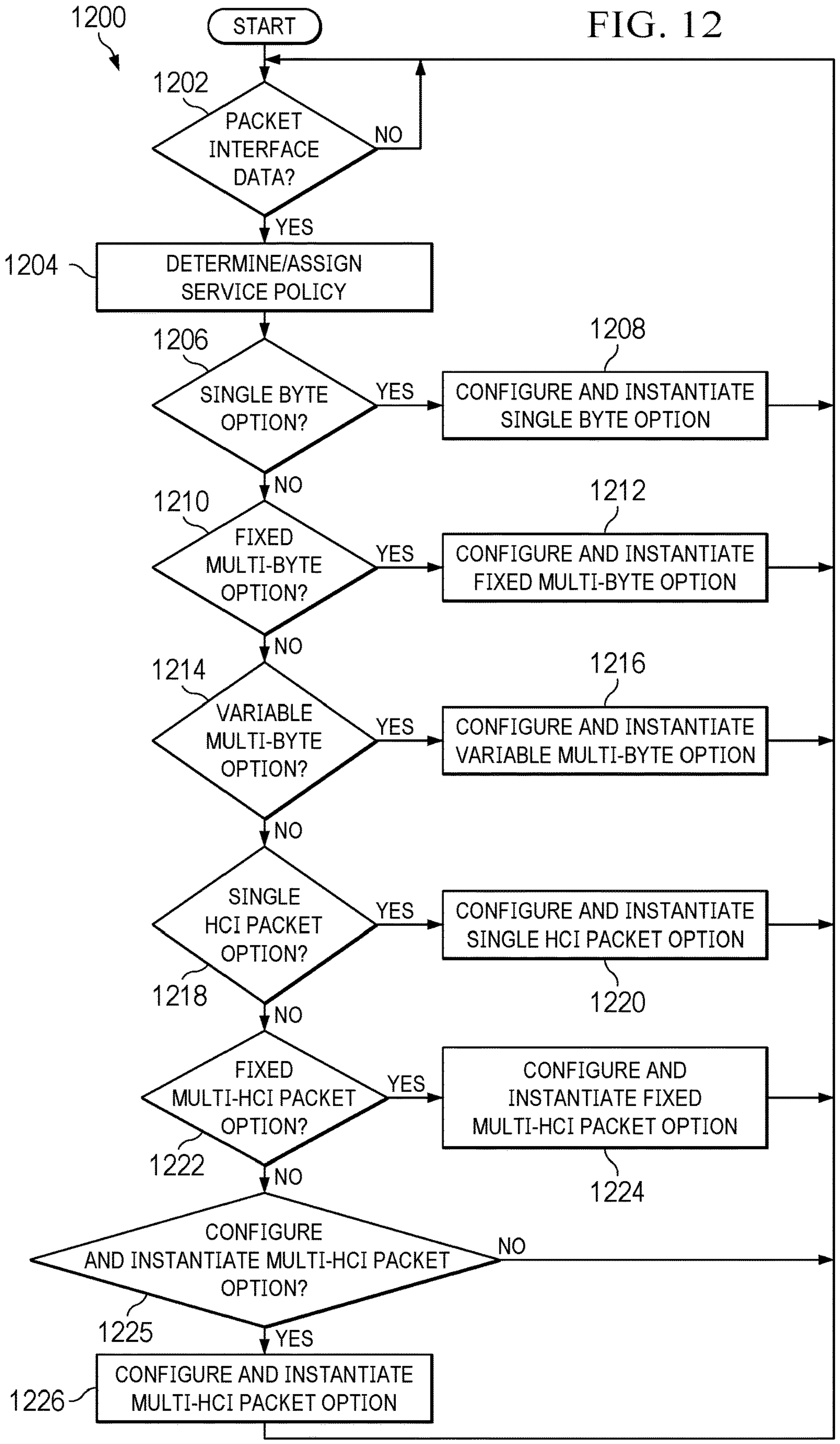
FIGS. 12-16 are flowcharts representative of example machine-readable instructions and/or example operations that may be executed, instantiated, and/or performed to implement the example Bluetooth devices of FIGS. 1-9, 10A, 10B, 11A and 11B.

FIG. 12 is a flowchart representative of example machine-readable instructions and/or example operations 1200 that may be executed, instantiated, and/or performed by programmable circuitry to improve (e.g., increase information throughput capabilities) HCI communication. As used herein, references to particular structure in the flowcharts of FIGS. 12-16 will utilize reference numbers from the illustrated example of FIG. 1. However, such structure includes different reference numbers for different examples disclosed herein in an effort to improve clarity and separation of different examples. For example, when describing examples of the flowcharts of FIGS. 12 through 16, any reference to host collector circuitry 122 will apply similarly to examples corresponding to the example collector splitter circuitry X22, where "X" represents a numeric value corresponding to FIGS. 2-9, 10A, 10B, 11A and/or 11B.

The example machine-readable instructions and/or the example operations 1200 of FIG. 12 begin at block 1202, at which example host or controller splitter circuitry (e.g., the example host splitter circuitry 120 or the example controller splitter circuitry 160) determines whether data (e.g., packet data, control data, combinations thereof, etc.) has been received and/or a request to send such data occurs. If not, the example operations 1200 of FIG. 12 may wait for such an occurrence. In response to the splitter circuitry detecting a request to send data (e.g., to send bytes, to send packets) (block 1202), the example splitter circuitry (e.g., the example host splitter circuitry 120, the example controller splitter circuitry 160) determines and/or otherwise assigns a service policy to be used by both the example host 102 and the example controller 104 during communication iterations (block 1204). As described above, the service policy (e.g., sometimes referred to as a service policy type) may include, but is not limited to the example single byte-level service policy, the example fixed multi byte-level service policy, the example variable multi byte-level service policy, the example single HCI packet-level service policy, the example fixed multi HCI packet-level service policy, and the example variable multi HCI packet-level service policy. Additionally, and as described above, while a particular service policy may be pre-configured or negotiated between the example host 102 and the example controller 104 (e.g., in which either may operate as the transmitter side) at a first time, the example splitter circuitry and/or the example collector circuitry may re-negotiate the particular service policy at a second time to be used in a dynamic manner. In some examples, the service policy selected by a transmitting device (e.g., splitter circuitry of a controller) is communicated to a receiving device (e.g., collector circuitry of a host) with an expectation of an acknowledgement signal to ensure that both the transmitting device and the receiving device are coordinated to implement the same service policy before any data is sent.

The example splitter circuitry (e.g., the host splitter circuitry 120, the controller splitter circuitry 160) determines whether the statically or dynamically selected service policy is of the single byte-level type (block 1206). If so, then the splitter circuitry configures and instantiates the single byte-level type with the corresponding collector circuitry (e.g., the example host collector circuitry 122, the example controller collector circuitry 162) (block 1208). As such, the example Bluetooth device operates in a manner consistent with the illustrated example of FIG. 2. Control then returns to block 1202 to determine whether one or more additional requests to transmit data occur.

In the event the splitter circuitry determines that the selected service policy is not a single byte-level type (block 1206), the splitter circuitry determines whether the selected service policy is selected and/or otherwise designated to operate as the service policy type corresponding to fixed multi byte-level (block 1210). If so, the splitter circuitry configures and instantiates the fixed multi byte-level service policy type with the corresponding controller circuitry (e.g., the example host collector circuitry 122, the example controller collector circuitry 162) (block 1212). Control then returns to block 1202 to determine whether one or more additional requests to transmit data occur.

In the event the splitter circuitry determines that the selected service policy is not a fixed multi byte-level type (block 1210), the splitter circuitry determines whether the selected service policy is selected and/or otherwise designated to operate as the service policy type corresponding to variable multi byte-level (block 1214). If so, the splitter circuitry configures and instantiates the variable multi byte-level service policy type with the corresponding controller circuitry (e.g., the example host collector circuitry 122, the example controller collector circuitry 162) (block 1216). Control then returns to block 1202 to determine whether one or more additional requests to transmit data occur.

In the event the splitter circuitry determines that the selected service policy is not a variable multi byte-level type (block 1214), the splitter circuitry determines whether the selected service policy is selected and/or otherwise designated to operate as the service policy type corresponding to single HCI packet-level (block 1218). If so, the splitter circuitry configures and instantiates the single HCI packet-level service policy type with the corresponding controller circuitry (e.g., the example host collector circuitry 122, the example controller collector circuitry 162) (block 1220). Control then returns to block 1202 to determine whether one or more additional requests to transmit data occur.

In the event the splitter circuitry determines that the selected service policy is not a single HCI packet-level type (block 1218), the splitter circuitry determines whether the selected service policy is selected and/or otherwise designated to operate as the service policy type corresponding to fixed multi HCI packet-level (block 1222). If so, the splitter circuitry configures and instantiates the fixed multi HCI packet-level service policy type with the corresponding controller circuitry (e.g., the example host collector circuitry 122, the example controller collector circuitry 162) (block 1224). Control then returns to block 1202 to determine whether one or more additional requests to transmit data occur.

In some embodiments, in the event the splitter circuitry determines that the selected service policy is not a fixed multi HCI packet-level type (block 1222), the splitter circuitry determines whether the selected service policy is selected and/or otherwise designated to operate as the service policy type corresponding to variable multi HCI packet-level (block 1225). If so, the splitter circuitry configures and instantiates the variable multi HCI packet-level service policy type with the corresponding controller circuitry (e.g., the example host collector circuitry 122, the example controller collector circuitry 162) (block 1226). Thereafter, or if the splitter circuitry determines that the selected service policy is not designated to operate as the service policy type corresponding to variable multi HCI packet-level (block 1225=No), control then returns to block 1202 to determine whether one or more additional requests to transmit data occur. In some examples, if a host and a controller include different and/or otherwise particular chipsets, then none of the various options of FIG. 12 may be supported.

In some examples, may support only some (or only one) of the options illustrated in FIG. 12. In some such examples, some of blocks 1206, 1210, 1214, 1218, 1222, 1208, 1212, 1216, 1220, 1224, and 1226 may be omitted. For example, in an example only supporting the single byte option, steps 1206, 1210, 1212, 1214, 1216, 1218, 1220, 1222, 1224, and 1226 may be omitted.

Figure 13:
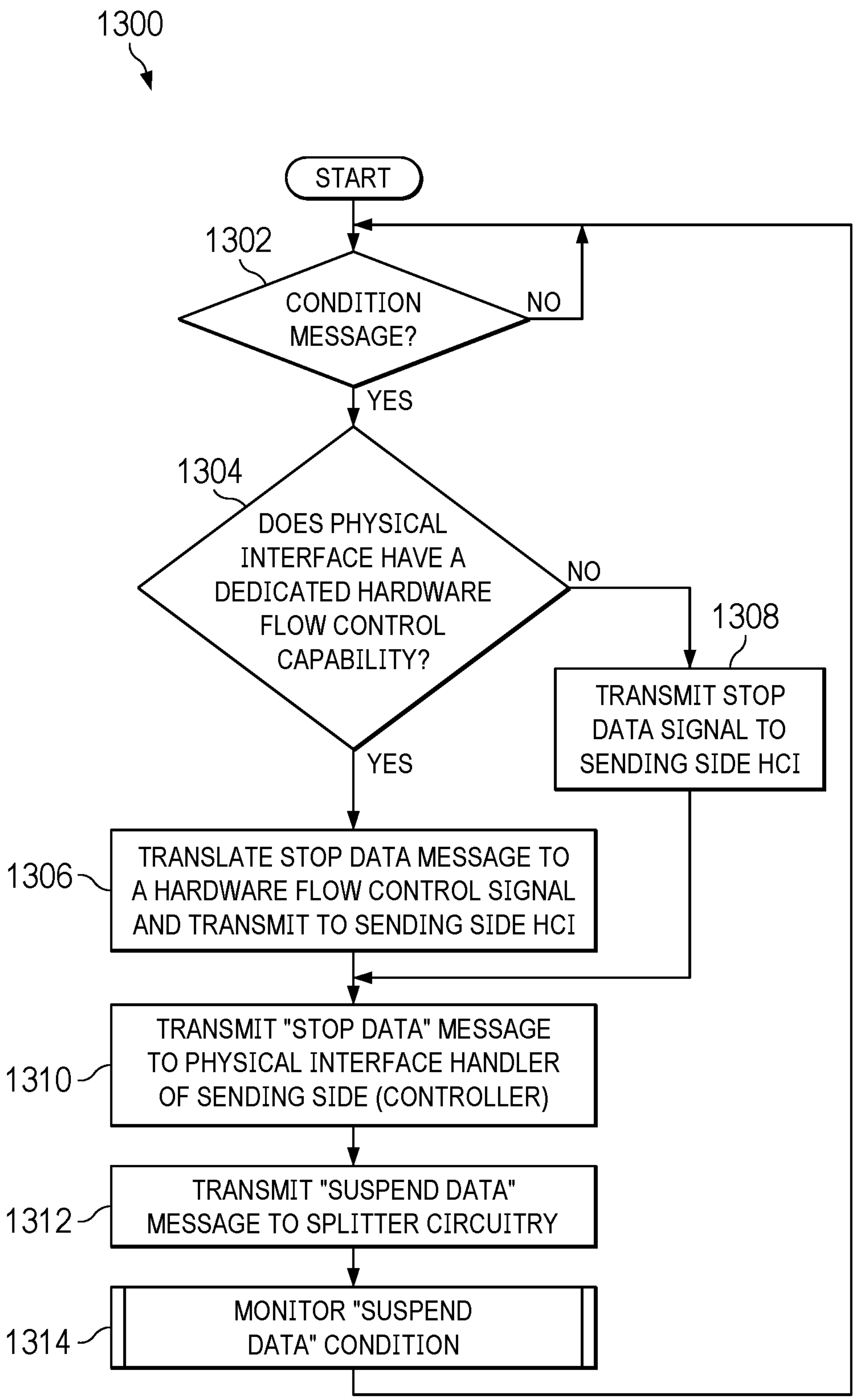

FIG. 13 is a flowchart representative of example machine-readable instructions and/or example operations 1300 that may be executed, instantiated, and/or performed by programmable circuitry to improve (e.g., increase information throughput capabilities) HCI communication. In particular, the illustrated example operations 1300 of FIG. 13 handle circumstances where one or more bytes, or one or more HCI packets do not reach their intended destination. The illustrated example operations 1300 of FIG. 13 begin at block 1302 where an HCI interface (e.g., the example first host HCI I/F 234 in the event the example host 202 is the receiving device that exhibits some type of error) determines whether a condition message has occurred. In some examples, the condition message is a hardware flow control signal to indicate an error or other problem exists, such as a UART FIFO full condition. If not, then the example operations 1300 of FIG. 13 may continue to monitor (e.g., periodically or asynchronously) for such an occurrence.

In the event the example HCI I/F detects a condition message (block 1302), then the example host 202 (or controller 204 depending on which device is sending or receiving) determines whether the physical interface (e.g., a UART) has a dedicated hardware flow control capability (block 1304). As described above, some example structure disclosed herein facilitate a manner of error notification that includes hardware flow control capabilities, while some example structure is not configured and/or otherwise capable of such hardware flow control. In the event of hardware flow control capabilities (block 1304), a stop data message is translated to a hardware flow control signal and transmitted to a sending-side HCI (block 1306). On the other hand, when hardware flow control capabilities are not available, the stop data message/signal may not be translated and, instead, transmitted directly to the sending side HCI (block 1308).

The example HCI interface from the receiving side (e.g., the example first host HCI I/F 234) transmits the condition message (e.g., stop data, suspend data, etc.) to a corresponding HCI interface from the sending side (e.g., the example first controller HCI I/F 274 (block 1310)). In some examples disclosed herein, the HCI interface on the sending side translates a stop data signal to a suspend data message/signal, which is transmitted to the sending side splitter circuitry (e.g., the example controller splitter circuitry 258) (block 1312) to cause a suspend data condition to be true (e.g., a suspend data flag is TRUE) for the affected link (e.g., the example first physical link 206 and its associated structure that normally enables bytes and/or packets to propagate between a host and controller). Additionally, and as described above, in some examples one or more signals may be backpropagated so that all elements of an affected link are notified and/or otherwise aware of any flow control augmentation.

Figure 14:
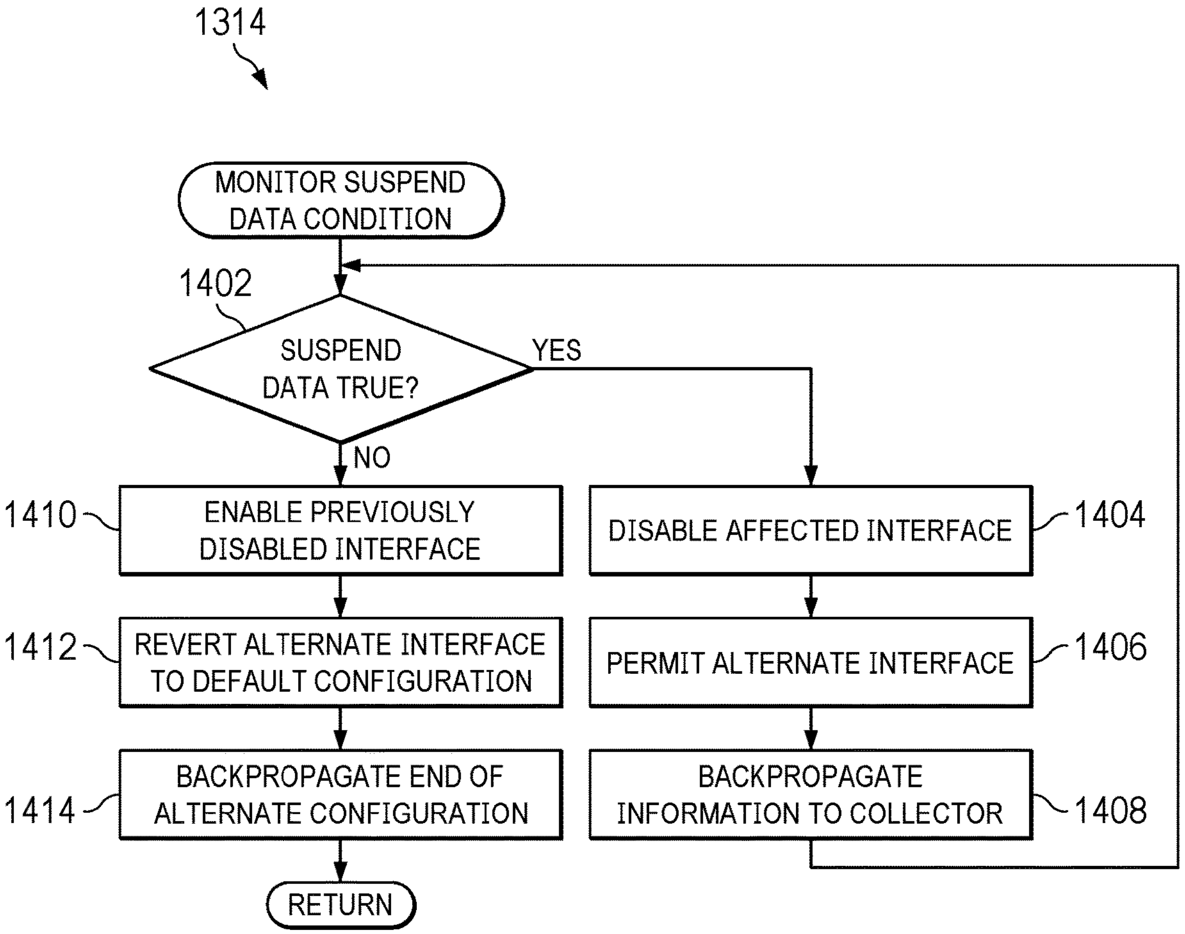

In some examples, the suspend data condition (e.g., a suspend data flag) is temporary and/or otherwise able to recover after a period of time when backed-up bytes and/or packets have been cleared from one or more FIFO buffers. As such, the example host 202 or controller 204 (depending on the direction of flow when the error occurred) monitors the suspend data condition (block 1314) (e.g., via the suspend data flag). FIG. 14 illustrates additional detail corresponding to monitoring the suspend data condition. In the illustrated example of FIG. 14, the example host or controller determines whether the suspend data flag is true or false (block 1402). In the event the suspend data flag is true (block 1402=YES), the example splitter circuitry (e.g., the example controller splitter circuitry 258) disables the affected interfaces and/or interface handler(s) (block 1404). In some examples disclosed herein, the splitter and/or collector circuitry affects the ability to disable the affected interfaces and/or interface handler(s) by blocking and/or otherwise diverting bytes and/or packets away from such interfaces. Continuing with the example round-robin flow, while the splitter circuitry previously caused odd-numbered bytes to be sent via the first physical link 206, in view of the TRUE suspend data flag the splitter circuitry instead redirects the odd-numbered bytes to an alternate interface (block 1406), such as the second physical link 208 and its associated structure. In some examples disclosed herein, the splitter circuitry (e.g., the example controller splitter circuitry 258) backpropagates information corresponding to the alternate interface to the collector circuitry (block 1408) (e.g., the example host collector circuitry 222) to inform it of the alternate transfer pattern. Thus, in some examples, the splitter circuitry lets the collector circuitry that odd-numbered bytes (or packets) will no longer be transmitted via the first physical link 206 and, instead, will be transmitted via the second physical link 208 to accommodate for the ongoing errors/conditions.

When the example host or controller determines that the suspend data flag is false (block 1402=NO), which is indicative of no error condition, the example splitter circuitry receives such information and enables the previously disabled interface (block 1410). Additionally, the splitter circuitry reverts the alternate interface back to its original operating pattern (block 1412), which in this example causes the second physical link 208 to exclusively handle even-numbered bytes and/or packets. To ensure that the collector circuitry is also aware that the error condition has ended and operations should resume as normal, such information may be backpropagated to the collector circuitry (block 1414) (e.g., the example host collector circuitry 222).

Figure 15:
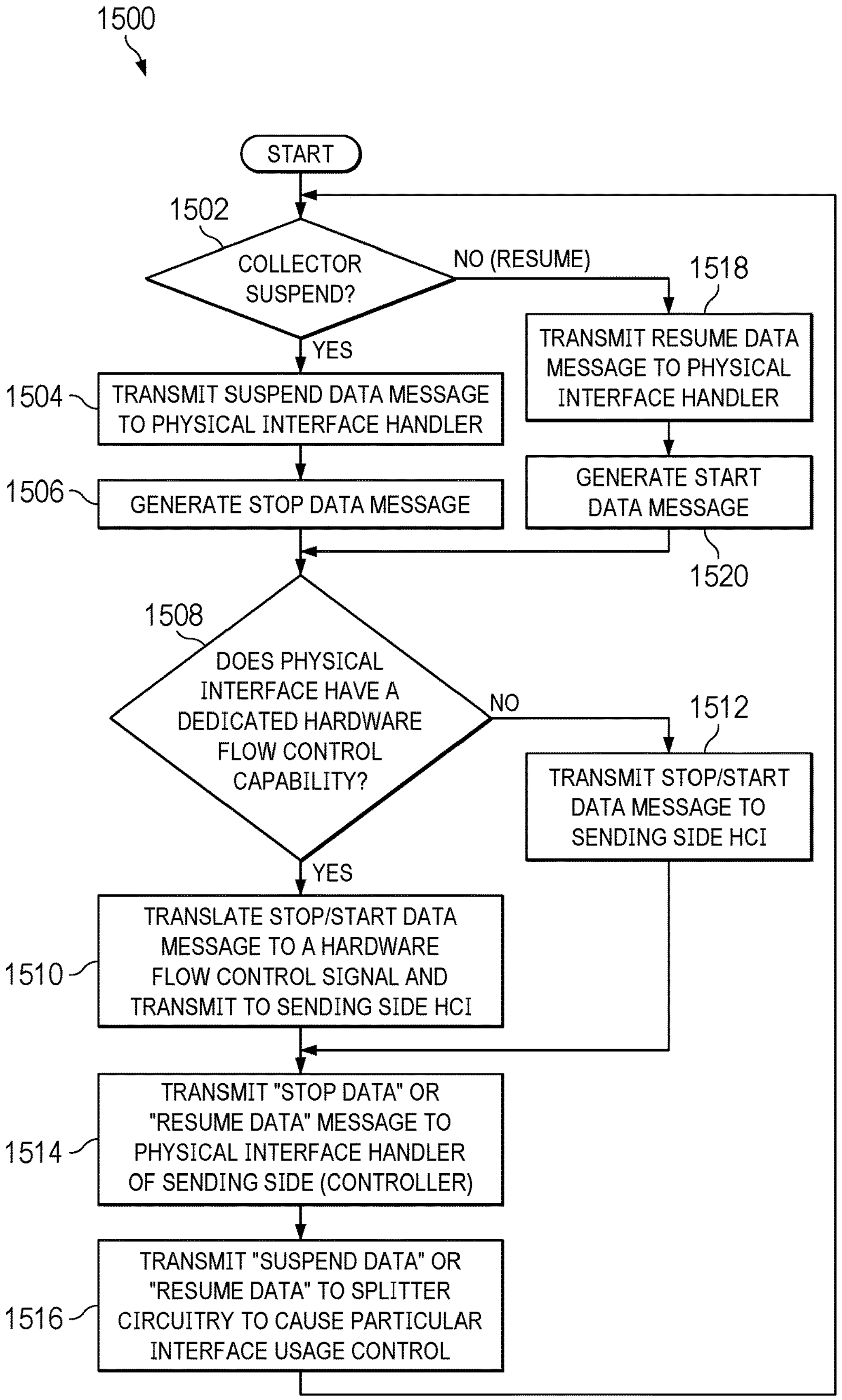

FIG. 15 is a flowchart representative of example machine-readable instructions and/or example operations 1500 that may be executed, instantiated, and/or performed by programmable circuitry to improve HCI communication. In particular, the illustrated example operations 1500 of FIG. 15 handle circumstances where the example collector determines that a data suspend condition should be invoked for one or more links and their associated structure (block 1502) (e.g., the example first link 206, the example second physical link 208, etc.). The illustrated example operations 1500 of FIG. 15 reflect the above-described subject matter corresponding to FIGS. 10A and 10B.

In the event the example collector determines that a condition (e.g., an error condition, a suspend condition, etc.) is true, such as an indication that a physical interface handler exhibits a UART FIFO full condition (block 1502=YES), then the collector (e.g., the example host collector circuitry 222) transmits a suspend data message to a corresponding physical interface handler (e.g., the example first host physical I/F handler 228) (block 1504), which generates a stop data message and/or otherwise sets a stop data flag (block 1506). As described above, some example physical interfaces have hardware flow control capabilities, while others do not. Examples disclosed herein accommodate for either circumstance. In the event the physical interface includes dedicated hardware flow control capabilities (block 1508=YES), then the stop data message is translated to a hardware flow control signal and the receiving-side HCI interface (e.g., the example first host HCI I/F 234) transmits it to a corresponding sending-side HCI interface (e.g., the example first collector HCI I/F 274) (block 1510). On the other hand, in the event the physical interface does not include dedicated hardware flow control capabilities (block 1508=NO), then the stop data message is sent in an unmodified manner to the corresponding sending-side HCI interface (e.g., the example first collector HCI I/F 274) (block 1512). While the illustrated example of FIG. 15 describes message transmission (e.g., suspend messages, resume messages, etc.), some examples disclosed herein perform one or more iterations where a message is not transmitted. Additionally, message transmission may include in-band transmission, out-of-band transmission (e.g., GPIO, shared memory R/W, etc.), and/or combinations thereof.

The example sending-side HCI interface transmits the stop data message to the example physical interface handler (e.g., the first controller physical I/F handler 268) (block 1514), which further transmits the stop data message (or suspend data message) to the example splitter (e.g., the example controller splitter circuitry 258) (block 1516). As described above, the stop or suspend data message causes the splitter to refrain from sending further data over the affected link, such as the example first physical link 206 and its associated structure. However, when any previous problem that may have existed stops (e.g., a prior UART FIFO full condition is gone), then the example operations 1500 of FIG. 15 may repeat, except with a resume data message instead of the previously described stop data message.

Figure 16:
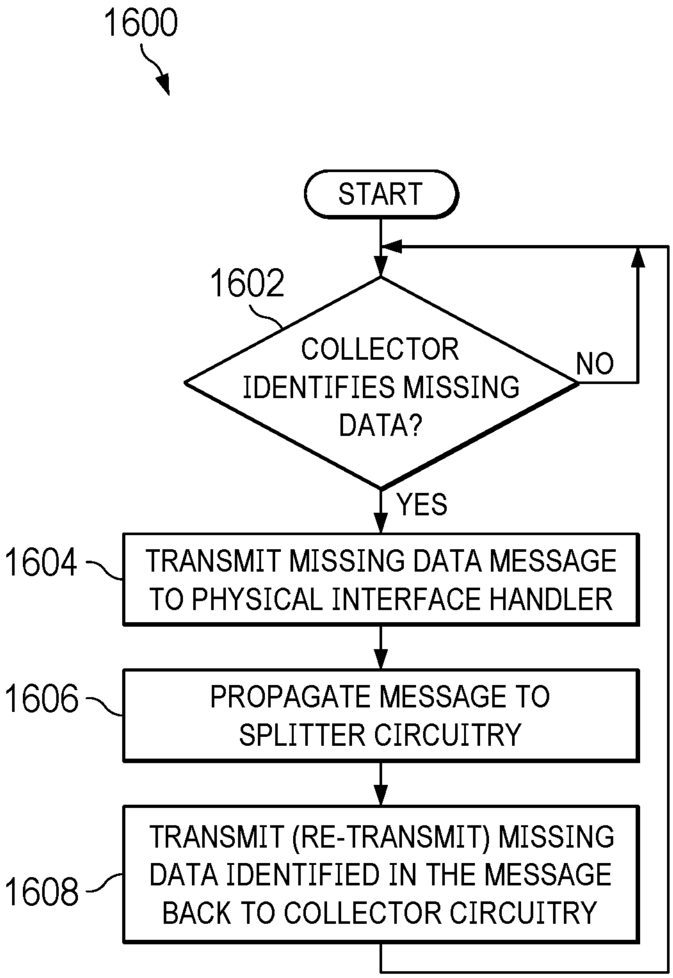

FIG. 16 is a flowchart representative of example machine-readable instructions and/or example operations 1600 that may be executed, instantiated, and/or performed by programmable circuitry to improve HCI communication in a manner consistent with FIGS. 11A and 11B above. In particular, the illustrated example operations 1600 of FIG. 16 handle circumstances where one or more bytes or packets has been discovered missing. As described above, and for the sake of illustration, the example host 202 and controller 204 operate in a round-robin manner to transmit odd-numbered bytes over the example first physical link 206 and even-numbered bytes over the example second physical link 208. The example collector circuitry (e.g., the host collector circuitry 272) expects B #X 1102 as described above in connection with FIG. 11A, but did not ultimately receive it (e.g., after a threshold period of time, after an out-of-order byte arrives, etc.) (block 1602). The example collector circuitry that detected the missing data sends (e.g., in-band, out-of-band) a missing byte message (or a missing packet message) to the sending entity to inform it of the missing data (block 1604). In some examples the collector circuitry (e.g., the example host collector circuitry 222) to the sending entity via a physical interface handler (e.g., the example first host physical I/F handler 228) (block 1604), then to an interface, and on to splitter circuitry of the original sending device (block 1606).

In some examples, the missing byte message (e.g., see missing byte message 1104 of FIG. 11A) identifies a payload of a byte number that is missing (e.g., B #5 was expected, but not received before B #7 arrived, or B #5 was expected within a threshold period of time, but not received). The missing byte message is transmitted and/or otherwise propagated to the controller splitter circuitry to augment its behavior (block 1606).

Upon receipt of the missing byte message, the controller splitter circuitry parses the message and identifies the corresponding byte number (e.g., a byte sequence identifier, such as B #3), and re-sends the corresponding missing byte back to the example collector circuitry (e.g., the example host collector circuitry 272) (block 1608). During a time in which such a condition occurs, one or more other interfaces may be disabled by flow control techniques disclosed herein.

Figure 17A:
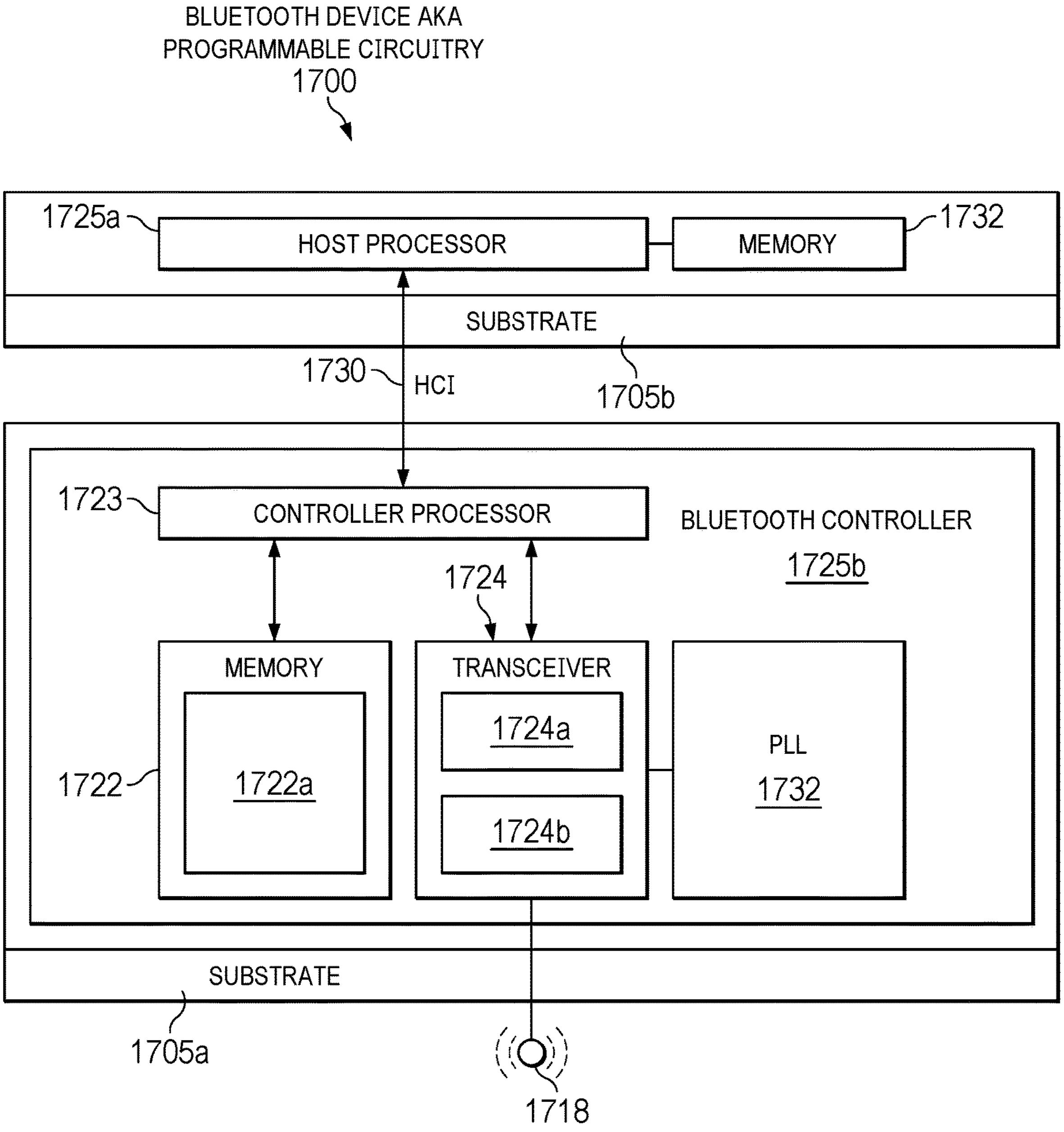
FIGS. 17A and 17B are block diagrams of example Bluetooth devices generally conforming to Bluetooth and/or Bluetooth Low Energy (BLE) communication standards.
Figure 18:
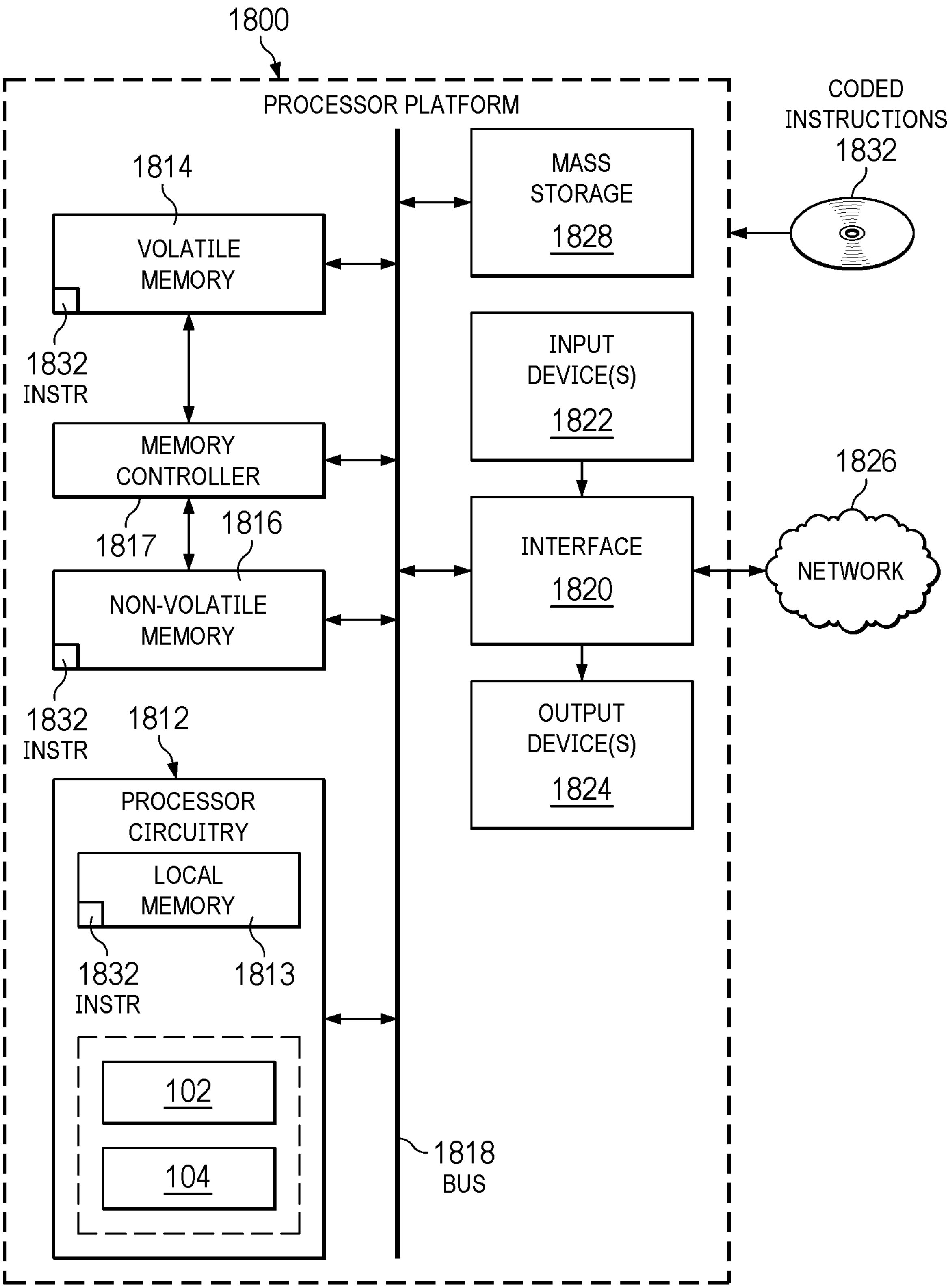
FIG. 18 is a block diagram of an example processing platform including programmable circuitry structured to execute, instantiate, and/or perform the example machine-readable instructions and/or perform the example operations of FIGS. 12-16 to implement the Bluetooth device(s) of FIGS. 1-9, 10A, 10B, 11A and 11B.

FIG. 17A shows a system block diagram representation for an example BT (or BLE) device 1700 that generally conforms to the BT and/or BLE communications standard. In some examples, the device 1700 of FIG. 17A is representative of example Bluetooth devices of FIGS. 1 through 16 (e.g., the example Bluetooth device 100 of FIG. 1, the example Bluetooth device 200 of FIG. 2, etc.). While examples disclosed herein refer to a BT device, examples are not limited thereto and such references to a BT device apply to BLE devices. The example BT device 1700 of FIG. 17A generally includes at least one integrated circuit (IC) shown formed on an example substrate 1705*a* having a semiconductor surface for the BT controller 1725*b*, and on another substrate 1705*b* having a semiconductor surface for an example host processor 1725*a*, described in further detail in connection with FIG. 18. In some examples, the host processor 1725*a* (and, e.g., memory 1732) and the controller 1723 (and, e.g., memory 1722, transceiver 1724 and PLL 1732) may be implemented in the same substrate and as part of the same IC.

The example BT device 1700 may be any device that can engage in BT communications. Such BT devices may be, may include, or may be a part of, mobile phones such as smartphones, tablets, computers, personal digital assistants, and household items with communication capabilities such as speakers, window blinds, and motion sensors. The example BT device 1700 in operation communicates in a BT network along with any number of other BT devices.

The example host processor 1725*a* and a BT controller 1725*b* communicate with one another over an example host controller interface (HCI) 1730. The example host processor 1725*a* includes an example memory 1732 that stores HCI firmware and/or HCI command code to facilitate topology definitions of a BT network, including configuring which one of the BT devices receives data (e.g., bytes, packets), and to which one of the BT devices data is forwarded to. The example BT controller 1725*b* includes an example processor 1723, an example memory 1722 including software source code 1722*a*. The example BT device 1700 of FIG. 17A also includes a transceiver 1724 including a radio frequency driver 1724*a* that is configured, structured and/or otherwise adapted to be coupled to an example antenna 1718 which is generally off chip. The example processors may include a digital signal processor (DSP) and/or microcontroller. The processors collectively implement an example BT protocol stack for BT operations, as described in further detail below in connection with FIG. 17B.

The example transceiver 1724 is also shown including digital logic hardware 1724*b* that can be used as an alternative to software 1722*a* for implementing disclosed methods, systems, articles of manufacture and apparatus to improve HCI communication. In some examples, the transceiver 1724 includes a transmitter and a receiver. The transmitter may include media access control (MAC) circuitry, an encoder, a modulator, Inverse Fast Fourier Transform (IFFT) circuitry, digital to analog conversion (DAC)/filter circuitry, and RF/antenna circuitry. The receiver may include RF/antenna circuitry, analog to digital conversion (ADC)/filter circuitry, FFT circuitry, a demodulator, a decoder, and MAC circuitry. An external antenna (not shown) may be coupled to the transceiver 1724.

The example memory 1722 may be any storage medium accessible by the example processor 1723, such as a read only memory (ROM), a random access memory (RAM), a register, cache memory, or magnetic media device such as internal hard disks and removable disks. An example phase lock loop (PLL) 1732 is also provided for purposes including mixing and frequency synthesis.

The example processor 1723 is coupled to and/or otherwise communicatively connected to the example memory 1722 and to the example transceiver 1724. In some examples, the transceiver 1724 includes baseband circuitry (not shown in FIG. 17A, but see FIG. 17B) and analog circuitry (not shown) to transmit and receive RF signals. Example baseband circuitry may include hardware to perform baseband signal processing including digital signal processing, coding and decoding, modulation, and demodulation. Analog circuitry may include hardware to perform analog-to-digital conversion (an ADC), digital to analog conversion (a DAC), filtering, gain adjusting, up-conversion, and down-conversion. The example analog circuitry may receive RF signals from an access point and down-convert the received RF signals to baseband signals to be processed by the baseband circuitry, or receive baseband signals from the baseband circuitry and up-convert the received baseband signals to RF wireless signals for uplink transmission. The analog circuitry includes a mixer to up-convert the baseband signals and down-convert the RF signals with a carrier signal oscillated at the radio frequencies of the BT network. The data rate utilized by the BT device 1700 may be in the current BT frequency band of 2.472 GHz to 2.479 GHz, or any future BT frequency band utilized.

Figure 17B:
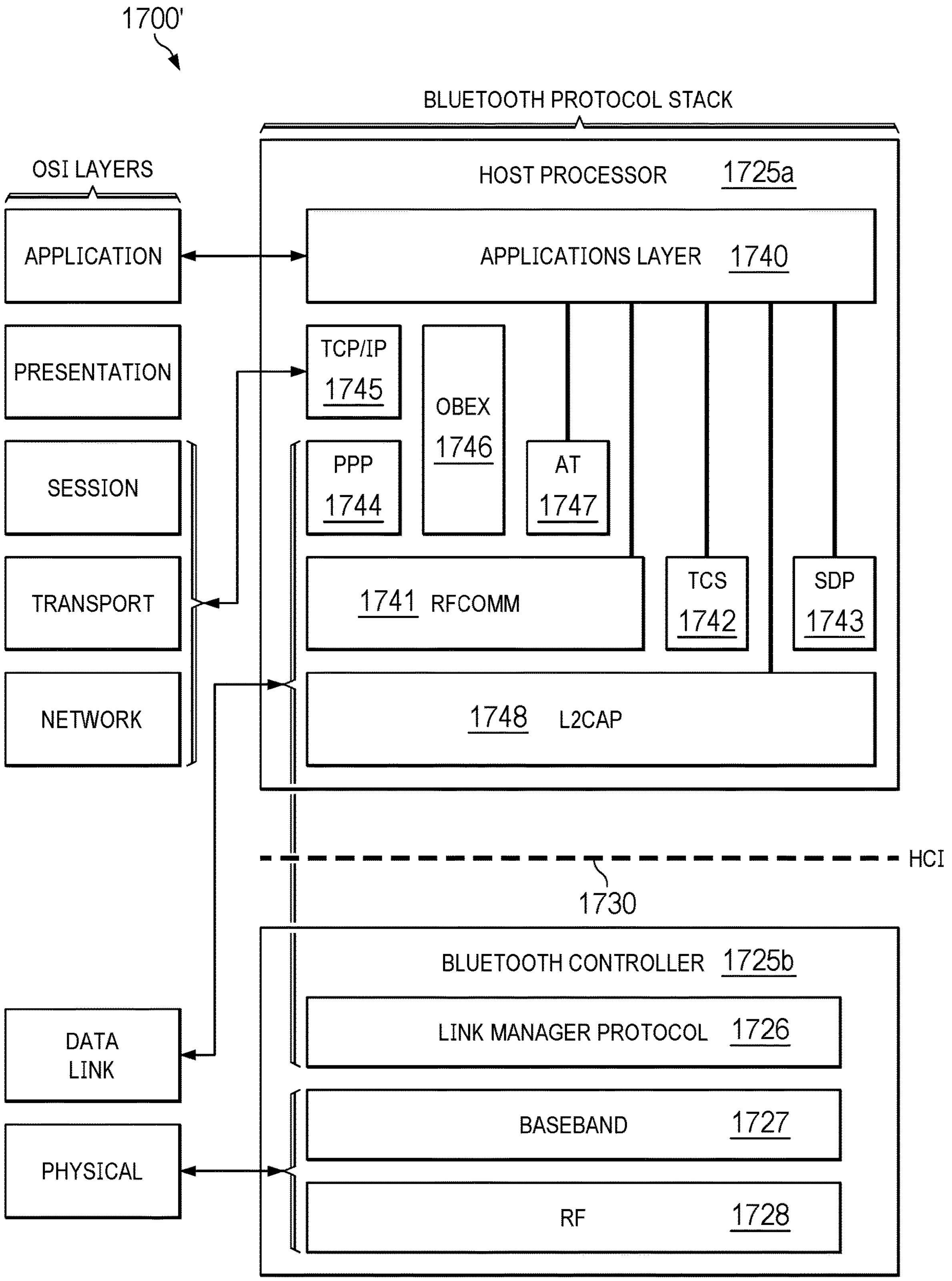

FIG. 17B is a functional layer depiction of the BT device 1700 shown in FIG. 17A now shown as 1700' showing the host processor 1725*a* including an application layer 1740 including BT applications and a Logical Link Control and Adaptation Layer Protocol (L2CAP) layer 1748. An example BT protocol RFCOMM layer 1741 is a set of transport protocols, made on top of the example L2CAP layer 1748. An example Telephony Control Protocol Specification (TCS) 1742 defines ways to send audio calls between BT devices. An example Service Discovery Protocol (SDP) 1743 is a specification that defines a way to represent a range of UUIDs (which are nominally 128 bits) in a shorter form. An example Point-to-Point Protocol (PPP 1744) is a data link (layer 2) protocol used to establish a direct connection between two device nodes. An example Transmission Control Protocol/Internet Protocol (TCP/IP) 1745 enables the BT device to carry TCP/IP traffic, an example OBEX 1746 is a communications protocol that facilitates the exchange of binary objects between BT devices, and an example AT 1747 is a command interface including a series of machine instructions used to activate features on the analog modem.

The example BT controller 1725*b* is shown including an example link manager protocol (LMP) 1726, an example baseband layer 1727 and an example RF layer 1728 that are part of the example transceiver 1724 shown in the illustrated example of FIG. 17A. The example BT controller 1725*b* is also shown including baseband circuitry 1727 and RF circuitry 1728. LMP 1726 controls and negotiates all aspects of the operation of the BT connection between two adjacent BT devices.

FIG. 18 is a block diagram of an example programmable circuitry platform 1800 structured to execute and/or instantiate the example machine-readable instructions and/or the example operations of FIGS. 12-16 to implement the Bluetooth device(s) of FIGS. 1-9, 10A, 10B, 11A and 11B. In some examples, the programmable circuitry platform 1800 may represent the example host processor 1725*a* of FIGS. 17A and 17B, or the example controller processor 1723 of FIG. 17A. The programmable circuitry platform 1800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1800 of the illustrated example includes programmable circuitry 1812. The programmable circuitry 1812 of the illustrated example is hardware. For example, the programmable circuitry 1812 can be implemented by one or more integrated circuits, logic circuits, FPGAs, microprocessors, CPUs, GPUs, DSPs, and/or microcontrollers from any desired family or manufacturer. The programmable circuitry 1812 may be implemented by one or more semiconductor based (e.g., silicon based) devices.

The programmable circuitry 1812 of the illustrated example includes a local memory 1813 (e.g., a cache, registers, etc.). The programmable circuitry 1812 of the illustrated example is in communication with main memory 1814, 1816, which includes a volatile memory 1814 and a non-volatile memory 1816, by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817. In some examples, the memory controller 1817 may be implemented by one or more integrated circuits, logic circuits, microcontrollers from any desired family or manufacturer, or any other type of circuitry to manage the flow of data going to and from the main memory 1814, 1816.

The programmable circuitry platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user (e.g., a human user, a machine user, etc.) to enter data and/or commands into the programmable circuitry 1812. The input device(s) 1822 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1800 of the illustrated example also includes one or more mass storage discs or devices 1828 to store firmware, software, and/or data. Examples of such mass storage discs or devices 1828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1832, which may be implemented by the machine-readable instructions of FIGS. 12-16, may be stored in the mass storage device 1828, in the volatile memory 1814, in the non-volatile memory 1816, and/or on at least one non-transitory computer readable storage medium such as a CD or DVD which may be removable.

It should be understood that some or all of the circuitry of FIGS. 1-9, 10A, 10B, 11A and 11B may, thus, be instantiated at the same or different times. In some examples, some or all of the circuitry of FIGS. 1-9, 10A, 10B, 11A and 11B may be instantiated, for example, in one or more threads executing concurrently and/or in series. Moreover, in some examples, some or all of the circuitry of FIGS. 1-9, 10A, 10B, 11A and 11B may be implemented within one or more virtual machines and/or containers executing on a microprocessor. In some examples, the programmable circuitry 1812 of FIG. 18 may be in one or more packages. In some examples, an XPU may be implemented by the programmable circuitry 1812 of FIG. 18, which may be in one or more packages. For example, the XPU may include a CPU in one package, a DSP in another package, a GPU in yet another package, and an FPGA in still yet another package.

Although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as “first,” “second,” “third,” etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for identifying those elements distinctly within the context of the discussion (e.g., within a claim) in which the elements might, for example, otherwise share a same name.

As used herein, “approximately” and “about” modify their subjects/values to recognize the potential presence of variations that occur in real world applications. For example, “approximately” and “about” may modify dimensions that may not be exact due to manufacturing tolerances and/or other real world imperfections as will be understood by persons of ordinary skill in the art. For example, “approximately” and “about” may indicate such dimensions may be within a tolerance range of +/−10% unless otherwise specified herein.

As used herein, the phrase “in communication,” including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, “programmable circuitry” may include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

From the foregoing, it will be appreciated that example systems, apparatus, articles of manufacture, and methods have been disclosed that improve host-controller interface (HCI) communication, particularly with Bluetooth devices that utilize bandwidth-limited structure (e.g., UART devices). Some examples disclosed herein advantageously improve Bluetooth device bandwidth capabilities without augmenting physical interfaces and/or otherwise increasing a device footprint. Because some examples disclosed herein facilitate a virtual HCI interface communicatively connected to physical interfaces, host/controller communication may be increased via aggregation of two or more physical interfaces. Disclosed systems, apparatus, articles of manufacture, and methods are accordingly directed to one or more improvement(s) in the operation of a machine such as a computer or other electronic and/or mechanical device.

Example embodiments of the present disclosure are summarized here. Other embodiments can also be understood from the entirety of the specification and the claims filed herein.

Example 1. A device including: a first communication interface having a first bandwidth; a second communication interface having a second bandwidth; and selection circuitry configured to aggregate communication associated with the first communication interface and the second communication interface to an aggregation interface having a third bandwidth greater than the first bandwidth or the second bandwidth.

Example 2. The device of example 1, where the first communication interface includes transmitter circuitry having a single communication path to receiver circuitry.

Example 3. The device of one of examples 1 or 2, where the first communication interface is a universal asynchronous receiver/transmitter (UART).

Example 4. The device of one of examples 1 to 3, where the first communication interface includes transceiver circuitry and a physical host-controller interface (HCI).

Example 5. The device of one of examples 1 to 4, where the selection circuitry includes at least one of a multiplexer or a demultiplexer.

Example 6. The device of one of examples 1 to 5, where the selection circuitry further includes splitter circuitry configured to route an input data stream to the first or second communication interfaces.

Example 7. The device of one of examples 1 to 6, where the splitter circuitry is configured to route respective bytes of the input data stream to the first and second communication interfaces in a schedule.

Example 8. The device of one of examples 1 to 7, where the input data stream includes at least one of bytes or packets.

Example 9. The device of one of examples 1 to 8, where the splitter circuitry is configured to: route first bytes of the input data stream to the first communication interface; and route second bytes of the input data stream to the second communication interface.

Example 10. The device of one of examples 1 to 9, where the splitter circuitry is configured to route the first bytes and the second bytes in a round-robin schedule.

Example 11. The device of one of examples 1 to 10, where the first bytes are odd numbered bytes and the second bytes are even numbered bytes.

Example 12. The device of one of examples 1 to 11, where the splitter circuitry is configured to generate a flow control header.

Example 13. The device of one of examples 1 to 12, where the splitter circuitry is configured to cause the flow control header to designate first bytes for transmission by the first communication interface and second bytes for transmission by the second communication interface.

Example 14. The device of one of examples 1 to 13, where the splitter circuitry is configured to cause collector circuitry to organize bytes corresponding to the input data stream based on the flow control header.

Example 15. The device of one of examples 1 to 14, where the flow control header includes organizational control data.

Example 16. The device of one of examples 1 to 15, where the splitter circuitry is configured to cause collector circuitry to organize an output data stream in a first order different than a second order corresponding to the input data stream.

Example 17. The device of one of examples 1 to 16, where the second order corresponding to the input data stream is non-consecutive, the splitter circuitry configured to reconstruct the non-consecutive order to a consecutive order corresponding to the first order of the output data stream.

Example 18. The device of one of examples 1 to 17, where the splitter circuitry is configured to receive an interface report from collector circuitry after the input data stream is routed.

Example 19. The device of one of examples 1 to 18, where the splitter circuitry is configured to receive the interface report via at least one of in-band or out-of-band communication.

Example 20. The device of one of examples 1 to 19, where the splitter circuitry is configured to cause the selection circuitry to halt routing to one of the first communication interface or the second communication interface based on the interface report.

Example 21. The device of one of examples 1 to 20, where the interface report includes a congestion flag corresponding to a communication interface associated with the collector circuitry.

Example 22. The device of one of examples 1 to 21, where the first communication interface and the second communication interface are configured to route single bytes of an input data stream to the aggregation interface in a round-robin schedule.

Example 23. The device of one of examples 1 to 22, where the first communication interface is configured to route odd-numbered bytes and the second communication interface is configured to route even-numbered bytes.

Example 24. The device of one of examples 1 to 23, where the first communication interface and the second communication interface are configured to route a fixed quantity of bytes of an input data stream to the aggregation interface in a schedule.

Example 25. The device of one of examples 1 to 24, where the schedule is a round-robin schedule.

Example 26. The device of one of examples 1 to 25, where the first communication interface and the second communication interface are configured to route a quantity of bytes of an input data stream based on header instructions.

Example 27. The device of one of examples 1 to 26, where the selection circuitry is configured to parse the header instructions to: designate first ones of the quantity of bytes to the first communication interface; and designate second ones of the quantity of bytes to the second communication interface.

Example 28. The device of one of examples 1 to 27, where the first communication interface and the second communication interface are configured to route single packets of an input data stream to the aggregation interface in a round-robin schedule.

Example 29. The device of one of examples 1 to 28, where the first communication interface and the second communication interface are configured to route a quantity of packets of an input data stream to the aggregation interface in a round-robin schedule, the quantity of packets corresponding to the first communication interface equal to the quantity of packets corresponding to the second communication interface.

Example 30. The device of one of examples 1 to 29, where the first communication interface and the second communication interface are configured to route a quantity of packets of an input data stream based on header instructions.

Example 31. The device of one of examples 1 to 30, where the selection circuitry is configured to parse the header instructions to: cause first ones of the quantity of packets to be routed to the first communication interface; and cause second ones of the quantity of packets to be routed to the second communication interface.

Example 32. The device of one of examples 1 to 31, where the first communication interface and the second communication interface are configured to aggregate the communications as half-duplex.

Example 33. The device of one of examples 1 to 32, where the device is at least one of a Bluetooth device or a Bluetooth low energy device.

Example 34. The device of one of examples 1 to 33, where the device is a controller, the first communication interface and the second communication interface configured to communicate with a corresponding host device.

Example 35. The device of one of examples 1 to 34, where the device is a host device, the first communication interface and the second communication interface configured to communicate with a corresponding controller via one or more host controller interfaces.

Example 36. A device including: selection circuitry configured to route a first data stream, the first data stream having a first bandwidth; and two or more communication interfaces configured to receive the first data stream, respective ones of the two or more communication interfaces configured to transmit a portion of the first data stream at a second bandwidth, the second bandwidth less than the first bandwidth.

Example 37. The device of example 36, where the device is a host device, the respective ones of the two or more communication interfaces to transmit the portion of the first data stream to a controller device.

Example 38. The device of one of examples 36 or 37, where the device is a controller device, the respective ones of the two or more communication interfaces to transmit the portion of the first data stream to a host device.

Example 39. A method including: negotiating a service policy in response to detecting a request to send data from a first device to a second device; transmitting, based on the service policy, a first portion of data from the first device to a first communication interface having a first bandwidth; transmitting, based on the service policy, a second portion of the data from the first device to a second communication interface having the first bandwidth; and aggregating the first communication interface and the second communication interface to transfer the first portion and the second portion of the data to the second device at a second bandwidth higher than the first bandwidth.

Example 40. The method of example 39, further including transmitting the first portion of the data and the second portion of the data in a round-robin schedule.

Example 41. The method of one of examples 39 or 40, further including transmitting the first portion of the data having odd-numbered bytes to the first communication interface and transmitting the second portion of the data having even-numbered bytes to the second communication interface when the service policy is associated with a single byte-level type.

Example 42. The method of one of examples 39 to 41, further including transmitting the first portion of the data having a first quantity of bytes to the first communication interface and transmitting the second portion of the data having a second quantity of bytes to the second communication interface when the service policy is associated with a fixed byte-level type.

Example 43. The method of one of examples 39 to 42, where the first quantity of bytes is equal to the second quantity of bytes.

Example 44. The method of one of examples 39 to 43, where the service policy is negotiated at a first time and a second service policy is negotiated at a second time after the first time.

Example 45. The method of one of examples 39 to 44, where the service policy is at least one of negotiated or predetermined.

Example 46. The method of one of examples 39 to 45, further including transmitting the first portion of data having odd numbered packets to the first communication interface and transmitting the second portion of the data having even numbered packets to the second communication interface when the service policy is associated with a packet-level type.

The following claims are hereby incorporated into this Detailed Description by this reference. While this disclosure has been described with reference to illustrative embodiments, this description is not limiting. Various modifications and combinations of the illustrative embodiments, as well as other embodiments, will be apparent to persons skilled in the art upon reference to the description.

What is claimed is:

1. A device comprising:

a first communication interface between a host and a controller, the first communication interface having a first bandwidth;

a second communication interface between the host and the controller, the second communication interface having a second bandwidth; and selection circuitry configured to aggregate communication associated with the first communication interface and the second communication interface to an aggregation interface having a third bandwidth greater than the first bandwidth or the second bandwidth.

2. The device of claim 1, wherein the first communication interface includes transmitter circuitry having a single communication path to receiver circuitry.

3. The device of claim 1, wherein the first communication interface is a universal asynchronous receiver/transmitter (UART).

4. The device of claim 1, wherein the first communication interface includes transceiver circuitry and a physical host-controller interface (HCI).

5. The device of claim 1, wherein the selection circuitry includes at least one of a multiplexer or a demultiplexer.

6. The device of claim 1, wherein the selection circuitry further includes splitter circuitry configured to route an input data stream to the first or second communication interfaces.

7. The device of claim 6, wherein the splitter circuitry is configured to route respective bytes of the input data stream to the first and second communication interfaces in a schedule.

8. The device of claim 6, wherein the splitter circuitry is configured to:

route first bytes of the input data stream to the first communication interface; and route second bytes of the input data stream to the second communication interface.

9. The device of claim 8, wherein the splitter circuitry is configured to route the first bytes and the second bytes in a round-robin schedule.

10. The device of claim 9, wherein the first bytes are odd numbered bytes and the second bytes are even numbered bytes.

11. The device of claim 6, wherein the splitter circuitry is configured to cause a flow control header to designate first bytes for transmission by the first communication interface and second bytes for transmission by the second communication interface.

12. The device of claim 6, wherein the splitter circuitry is configured to cause collector circuitry to organize bytes corresponding to the input data stream based on a flow control header.

13. The device of claim 6, wherein the splitter circuitry is configured to cause collector circuitry to organize an output data stream in a first order different than a second order corresponding to the input data stream.

14. The device of claim 13, wherein the second order corresponding to the input data stream is non-consecutive, the splitter circuitry configured to reconstruct the non-consecutive order to a consecutive order corresponding to the first order of the output data stream.

15. The device of claim 6, wherein the splitter circuitry is configured to receive an interface report from collector circuitry after the input data stream is routed.

16. The device of claim 15, wherein the splitter circuitry is configured to receive the interface report via at least one of in-band or out-of-band communication.

17. The device of claim 16, wherein the interface report includes a congestion flag corresponding to a communication interface associated with the collector circuitry.

18. The device of claim 15, wherein the splitter circuitry is configured to cause the selection circuitry to halt routing to one of the first communication interface or the second communication interface based on the interface report.

19. The device of claim 1, wherein the first communication interface and the second communication interface are configured to route single bytes of an input data stream to the aggregation interface in a round-robin schedule.

20. The device of claim 1, wherein the first communication interface and the second communication interface are configured to route a fixed quantity of bytes of an input data stream to the aggregation interface in a schedule.

21. The device of claim 1, wherein the first communication interface and the second communication interface are configured to route a quantity of bytes of an input data stream based on header instructions.

22. The device of claim 21, wherein the selection circuitry is configured to parse the header instructions to:

designate first ones of the quantity of bytes to the first communication interface; and designate second ones of the quantity of bytes to the second communication interface.

23. The device of claim 1, wherein the first communication interface and the second communication interface are configured to route single packets of an input data stream to the aggregation interface in a round-robin schedule.

24. The device of claim 1, wherein the first communication interface and the second communication interface are configured to route a quantity of packets of an input data stream to the aggregation interface in a round-robin schedule, the quantity of packets corresponding to the first communication interface equal to the quantity of packets corresponding to the second communication interface.

25. The device of claim 1, wherein the first communication interface and the second communication interface are configured to route a quantity of packets of an input data stream based on header instructions.

26. The device of claim 25, wherein the selection circuitry is configured to parse the header instructions to:

cause first ones of the quantity of packets to be routed to the first communication interface; and cause second ones of the quantity of packets to be routed to the second communication interface.

27. The device of claim 1, wherein the device is a controller, the first communication interface and the second communication interface configured to communicate with a corresponding host device.

28. The device of claim 1, wherein the device is a host device, the first communication interface and the second communication interface configured to communicate with a corresponding controller via one or more host controller interfaces.

* * * * *